(12) United States Patent
Obayashi et al.

(10) Patent No.: US 10,389,904 B2
(45) Date of Patent: Aug. 20, 2019

(54) IMAGE FORMING DEVICE, CONTROL METHOD, AND RECORDING MEDIUM

(71) Applicant: KONICA MINOLTA, INC., Chiyoda-ku, Tokyo (JP)

(72) Inventors: Makoto Obayashi, Toyokawa (JP); Takaki Uemura, Seto (JP); Masayuki Iijima, Okazaki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/974,949

(22) Filed: May 9, 2018

(65) Prior Publication Data

US 2018/0367693 A1    Dec. 20, 2018

(30) Foreign Application Priority Data

Jun. 19, 2017    (JP) .................... 2017-119511

(51) Int. Cl.
| | | |
|---|---|---|
| G03G 15/04 | (2006.01) | |
| H04N 1/028 | (2006.01) | |
| G03G 15/041 | (2006.01) | |
| G03G 15/00 | (2006.01) | |
| G03G 15/08 | (2006.01) | |
| G03G 15/043 | (2006.01) | |
| F21Y 115/10 | (2016.01) | |

(52) U.S. Cl.
CPC ....... *H04N 1/02865* (2013.01); *G03G 15/043* (2013.01); *G03G 15/0415* (2013.01); *G03G 15/0806* (2013.01); *G03G 15/607* (2013.01); *F21Y 2115/10* (2016.08)

(58) Field of Classification Search
CPC ........... H04N 1/02865; G03G 15/0415; G03G 15/0806; G03G 15/607; G03G 15/043; F21Y 2115/10
See application file for complete search history.

(56) References Cited

U.S. PATENT DOCUMENTS

| | | | | |
|---|---|---|---|---|
| 6,061,526 A * | 5/2000 | Deguchi | ................ | H04N 1/047 396/89 |
| 9,557,563 B2 * | 1/2017 | Suzuki | ................... | G02B 26/12 |

FOREIGN PATENT DOCUMENTS

JP    2008155458 A    7/2008

* cited by examiner

*Primary Examiner* — Hoang X Ngo
(74) *Attorney, Agent, or Firm* — Holtz, Holtz & Volek PC

(57) ABSTRACT

An image forming device includes: a photoreceptor; a longitudinal light emitting member constituted from light emitting element rows that are arranged in a lateral direction and are each constituted from light emitting elements arranged in a longitudinal direction; an optical member that is longitudinal and is disposed to condense light emitted from the light emitting elements onto the photoreceptor; and a hardware processor that: selects and causes one or more light emitting elements for each light emitting element row to emit light; acquires an exposure amount for each light emitting element row; calculates a distribution of the exposure amounts acquired for the light emitting element rows, and calculates a position in the lateral direction corresponding to a predetermined exposure amount in the distribution; and judges whether a difference between the calculated position and a reference position in the lateral direction at a reference time is less than a threshold value.

12 Claims, 22 Drawing Sheets

FIG. 7
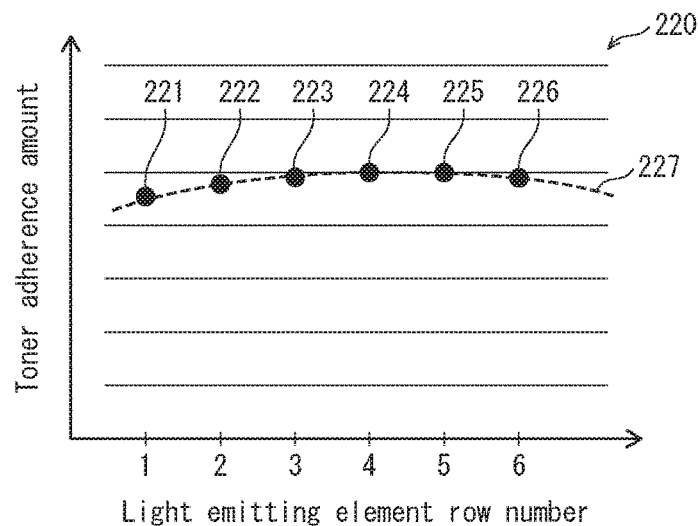
FIG. 8
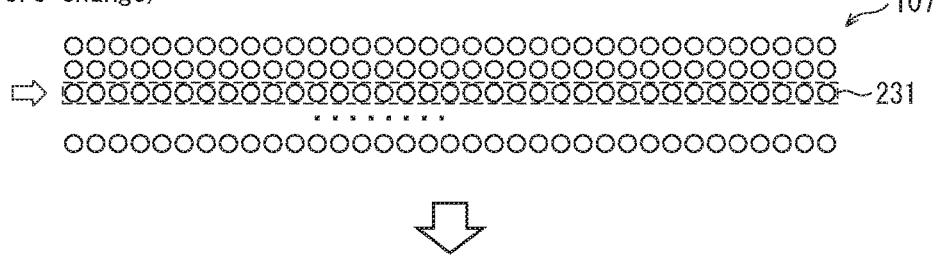
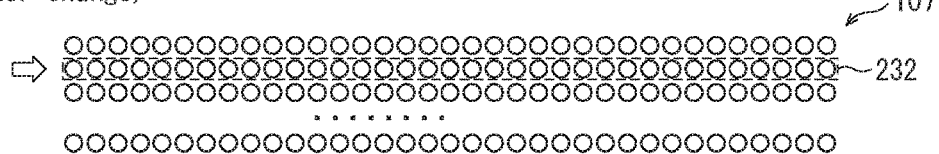

Longitudinal-directional
toner adherence amount table — 311

| Light emitting element number | Toner adherence amount |
|---|---|
| 10 | 70 |
| 11 | 71 |
| 12 | 72 |
| ⋮ | ⋮ |

Previous toner adherence amount table — 341

| Light emitting element row number | Toner adherence amount |
|---|---|
| 1 | 60 |
| 2 | 58 |
| 3 | 56 |
| ⋮ | ⋮ |

Current toner adherence amount table — 342

| Light emitting element row number | Toner adherence amount |
|---|---|
| 1 | 58 |
| 2 | 56 |
| 3 | 54 |
| ⋮ | ⋮ |

FIG. 23

Current toner adherence amount table  421

| Type number | Light emitting element row number | Toner adherence amount |
|---|---|---|
| 1 | 1 | 75 |
|   | 2 | 74 |
|   | 3 | 73 |
|   | ⋮ | ⋮ |
| 2 | 1 | 65 |
|   | 2 | 67 |
|   | 3 | 68 |
|   | ⋮ | ⋮ |

FIG. 24

Previous toner adherence amount table  431

| Type number | Light emitting element row number | Toner adherence amount |
|---|---|---|
| 1 | 1 | 78 |
|   | 2 | 77 |
|   | 3 | 76 |
|   | ⋮ | ⋮ |
| 2 | 1 | 68 |
|   | 2 | 69 |
|   | 3 | 70 |
|   | ⋮ | ⋮ |

IMAGE FORMING DEVICE, CONTROL METHOD, AND RECORDING MEDIUM

The entire disclosure of Japanese patent Application No. 2017-119511, filed on Jun. 19, 2017, is incorporated herein by reference in its entirety.

BACKGROUND

Technical Field

The present invention relates to image forming devices that perform optical writing onto photoreceptors.

Description of the Related Art

Recent image forming devices employing an electronic photography system disclosed in a conventional art (Japanese Patent Application Publication No. 2008-155458) are provided with exposure devices including a print substrate having a light emitting member mounted thereon and an optical member. The light emitting member is constituted from light emitting diodes (LEDs) arranged in a line-shaped region, and the optical member is constituted from rod lenses for image formation on a surface of a photoreceptor by light emitted from the LEDs.

According to the conventional art, the print substrate and the optical member sometimes expand and contract in the longitudinal direction with variation in environmental temperature, and this sometimes causes a positional shift in the longitudinal direction between the LEDs and the rod lenses. If such a positional shift occurs, unevenness in light amount might occur over all the surface of the photoreceptor. In order to correct this unevenness in light amount, a lens correction value is held in advance for each LED and, a light amount is corrected for each LED based on the lens correction value. Specifically, assume a case for example where 7680 LEDs are arranged in the longitudinal direction and 7680 lens correction values are held for the respective LEDs. In this case, when the environmental temperature falls within a predetermined temperature range, the lens correction values for the respective LEDs are used without modification. Meanwhile, when the environmental temperature falls outside the predetermined temperature range, one or two lens correction values that are arranged at predetermined positions are decimated from the lens correction values for the respective LEDs in accordance with the environmental temperature, and resultant values are used.

SUMMARY

According to the conventional art, as described above, when a positional shift occurs between the LEDs and the rod lenses in the longitudinal direction, light amounts for the respective LEDs are corrected with use of the lens correction values held for the respective LEDs in accordance with the environmental temperature, thus correcting the unevenness in light amount on the surface of the photoreceptor.

Unfortunately, the conventional art takes no account of a positional shift in the lateral direction between the LEDs and the rod lenses. A positional shift in the lateral direction is smaller than a positional shift in the longitudinal direction. However, when unevenness in light amount on the surface of the photoreceptor occurs with variation in environmental temperature, such a positional shift in the lateral direction easily tends to deteriorate the image quality such as variation in density of formed images by the unevenness in light amount. The correction method disclosed in the conventional art is applicable to a positional shift in the lateral direction. In fact, however, the conventional art merely estimates a positional shift caused by expansion and contraction of the members due to variation in environmental temperature. Since the positional shift in the lateral direction is considerably smaller than the positional shift in the longitudinal direction, the use of the correction values resulting from decimation increases a margin of error relative to proper correction values. This increases a possibility of application of correction values that do not reflect an actual positional shift amount.

Further, a slight number of LEDs are generally arranged in the lateral direction. According to the conventional art, since the LEDs are arranged in a single line in the longitudinal direction, the number of LEDs arranged in the lateral direction is one. Accordingly, the number of lens correction values in the lateral direction is also slight. Thus, as disclosed in the conventional art, no lens correction value might be obtained as a result of decimation of one or two lens correction values from the lens correction values for the respective LEDs at the environmental temperature falling outside the predetermined temperature range.

In view of this, the correction method disclosed in the conventional art is not necessarily effective. This causes inappropriate correction of the positional shift in the lateral direction, and thus causes unevenness in light amount on the surface of the photoreceptor.

The present invention aims to provide an image forming device that solves the above problem and is capable of detecting a positional shift in the lateral direction between a light emitting member and an optical member, and to provide a control method and a recording medium.

In order to achieve the above aim, an image forming device relating to at least one aspect of the present invention is an image forming device comprising: a photoreceptor; a longitudinal light emitting member that is constituted from light emitting element rows that are arranged in a lateral direction, the light emitting element rows each being constituted from light emitting elements that are arranged in a longitudinal direction; an optical member that is longitudinal in the longitudinal direction, is disposed so as to condense light emitted from the light emitting elements onto the photoreceptor, and has light condensing efficiency that is different depending on a position therein in the lateral direction; and a hardware processor that: selects, for each of the light emitting element rows, one or more light emitting elements among the light emitting elements constituting the light emitting element row, and causes the selected light emitting elements to emit light; acquires an exposure amount for each of the light emitting element rows; calculates a distribution of the exposure amounts that are acquired for the light emitting element rows, and calculates a position in the lateral direction corresponding to a predetermined exposure amount in the distribution; and judges whether a difference between the calculated position and a reference position in the lateral direction at a reference time is less than a threshold value.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the invention.

In the drawings:

FIG. 3A is a schematic planar view, FIG. 3B is a cross-sectional view taken along a line A-A', FIG. 3C is a cross-sectional view taken along a line C-C', and FIG. 3D is a schematic bottom view of the panel unit 106;

FIG. 7 is a graph showing a relation between light emitting element row number and toner adherence amount;

FIG. 8 schematically shows a light emitting element row that has been previously caused to emit light and a light emitting element row that is newly selected;

FIG. 23 shows an example of a current toner adherence amount table;

FIG. 24 shows an example of a previous toner adherence amount table;

DETAILED DESCRIPTION OF THE EMBODIMENTS

1 Embodiment

The following describes an image forming device 10 relating to an embodiment of the present invention with reference to the drawings. However, the scope of the invention is not limited to the disclosed embodiment.

1.1 Image Forming Device 10

Figure 1:
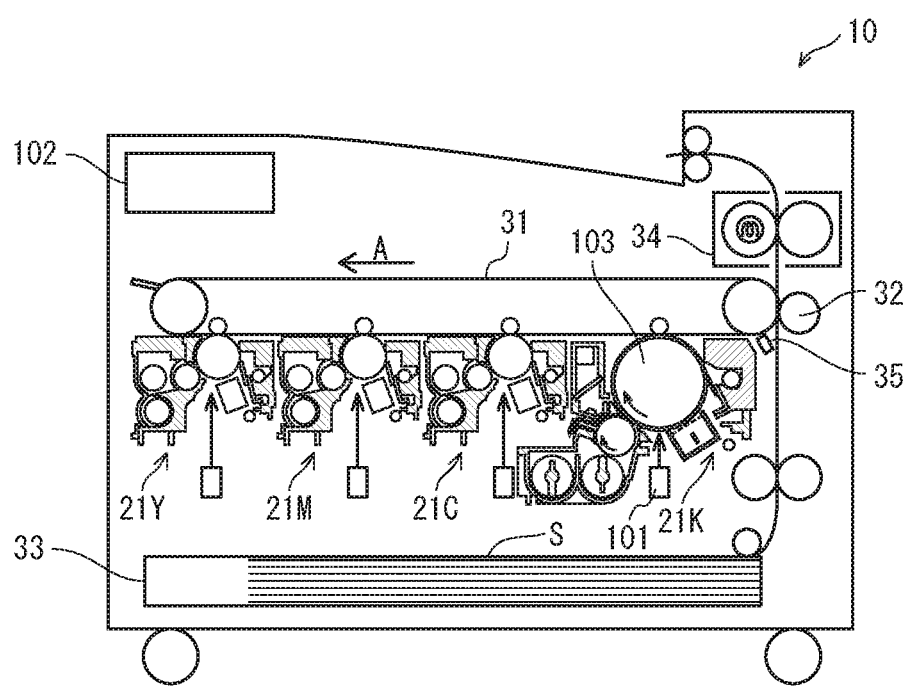
FIG. 1 shows major components of an image forming device 10 relating to an embodiment of the present invention.

FIG. 1 shows major components of the image forming device 10.

As shown in FIG. 1, the image forming device 10 is a so-called tandem type of color printer, and includes image forming units 21Y, 21M, 21C, and 21K that respectively form yellow (Y), magenta (M), cyan (C), and black (K) toner images under control by a control unit 102.

In the image forming unit 21K, for example, a charging device performs uniform charging on an outer circumferential surface of a photosensitive drum 103. As will described later, an optical writing unit 101 includes light emitting elements that are arranged in rows in a lattice arrangement in a main scanning direction (longitudinal direction in claims), and causes the light emitting elements to emit light according to a digital luminance signal generated by the control unit 102. This allows optical writing onto the outer circumferential surface of the photosensitive drum 103 to form an electrostatic latent image.

A developing device supplies toner to the outer circumferential surface of the photosensitive drum 103 to develop the electrostatic latent image to a toner image. A primary transfer roller electrostatically transfers (primarily transfers) the toner image carried on the photosensitive drum 103 onto an intermediate transfer belt 31.

Y, M, and C toner images which are respectively formed by the image forming units 21Y, 21M, and 21C are also primarily transferred onto the intermediate transfer belt 31 in the same manner, such that the Y, M, C, and K toner images overlap one another. The toner images resulting from the primary transfer are conveyed to a position of a sensor 35 by rotation of the intermediate transfer belt 31 in a direction indicated by an arrow A. The sensor 35 is provided in the vicinity of the intermediate transfer belt 31 between the image forming unit 21K and a secondary transfer roller 32. The sensor 35 acquires a toner adherence amount of the toner images formed on the intermediate transfer belt 31. Here, the toner adherence amount is an index for an amount of exposure by the optical writing unit 101. The toner images, which are formed on the intermediate transfer belt 31, are conveyed to the secondary transfer roller 32 by rotation of the intermediate transfer belt 31. In accordance with a conveyance timing of the toner images, a recording sheet S fed from a paper cassette 33 is further conveyed to the secondary transfer roller 32.

The secondary transfer roller 32 electrostatically transfers (secondarily transfers) the toner images carried on the intermediate transfer belt 31 onto the recording sheet S. The recording sheet S, on which the toner images are transferred, is discharged outside after thermal fusing of the toner images by a fusing device 34.

The image forming device 10 operates while switching between a print mode and a test mode. In the print mode, upon receiving a user instruction, the image forming device 10 forms a user's desired image and outputs a recording sheet. In the test mode, meanwhile, the image forming device 10 detects a positional shift in a lateral direction between a rod lens array 105 (optical member in claims) and a light emitting element array 107 (light emitting member in claims), which will be described later.

The image forming device 10 regularly switches from the print mode to the test mode to sense a positional shift in the lateral direction between the rod lens array 105 and the light emitting element array 107. This switching is performed for example once a month, specifically during hours such as at night when no user performs image formation.

1.2 Optical Writing Unit 101

Figure 2:
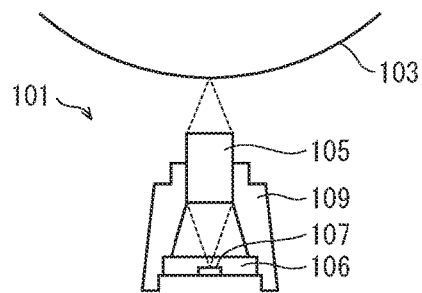
FIG. 2 is a cross-sectional view explaining an optical writing operation performed by an optical writing unit 101.

As shown in FIG. 2, the optical writing unit 101 includes the rod lens array 105 and a panel unit 106 that are housed in a holder 109 such that the rod lens array 105 condenses optical beam, which is emitted from the light emitting element array 107 included in the panel unit 106, onto the outer circumferential surface of the photosensitive drum 103.

(1) Panel Unit 106

Figures 3A, 3B:
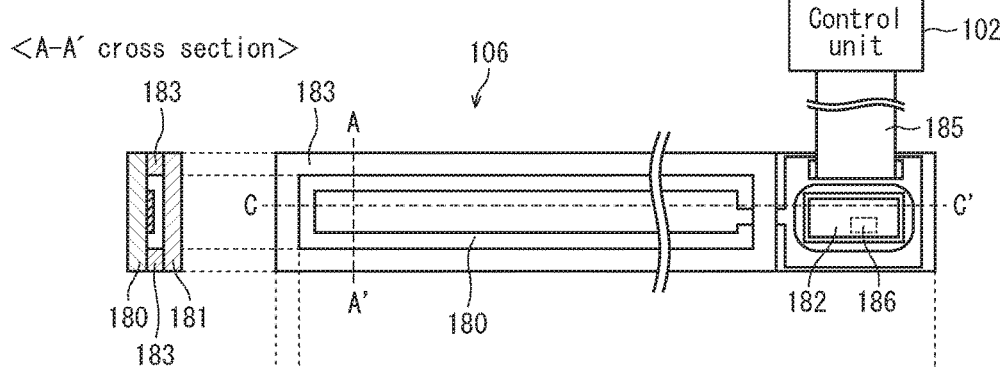
FIGS. 3A-3D show a panel unit 106, and specifically
Figure 3C:
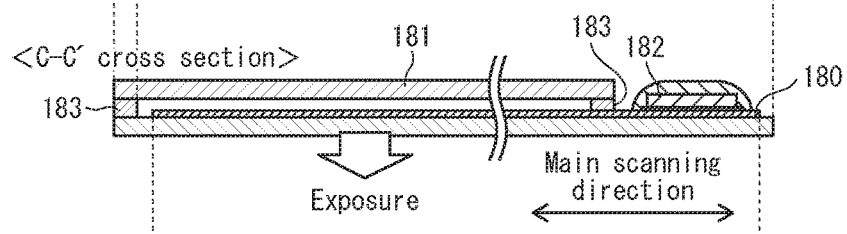
Figure 3D:
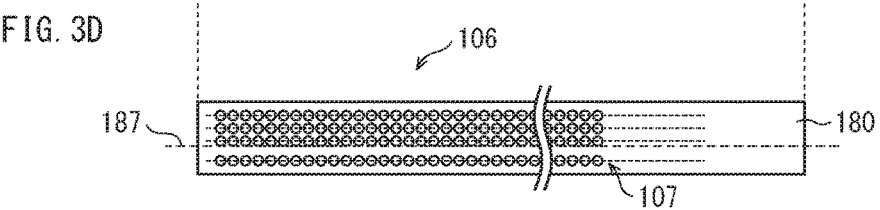

FIGS. 3A to 3D each show the panel unit 106. Specifically, FIG. 3A is a schematic plan view, FIG. 3B is a cross-sectional view taken along a line A-A', FIG. 3C is a cross-sectional view taken along a line C-C', and FIG. 3D is a schematic bottom view of the panel unit 106. Note that the panel unit 106 shown in the schematic plan view in FIG. 3A excludes a sealing plate 181, which will be described below.

As shown in FIGS. 3A to 3C, the panel unit 106 includes a thin film transistor (TFT) substrate 180, the sealing plate 181, a driver integrated circuit (IC) 182, and so on. The TFT substrate 180 is composed of an OLED layer and a TFT layer that are layered.

(a) OLED Layer of TFT Substrate 180

In the OLED layer of the TFT substrate 180, as shown in FIG. 3D, the light emitting element array 107 is constituted from light emitting element rows, for example six light emitting element rows, that are arranged at regular intervals in a sub scanning direction (lateral direction in claims). Also, the light emitting element rows are each constituted from light emitting elements that are arranged at regular intervals in a line-shaped region in the main scanning direction.

The light emitting elements each have a diameter of for example 60 μm, and are uniform in terms of shape, size, material, and so on.

FIG. 3D shows a virtual center line 187 in the main scanning direction of the light emitting element rows of the light emitting element array 107.

The light emitting elements are for example organic light emitting diodes (OLEDs). The OLEDs are each composed of four layers, namely a cathode, an organic layer including a light emitting layer, an anode, and a transparent substrate. The anode is a transparent electrode such as indium tin oxide (ITO), and the cathode is an electrode such as aluminum. The OLEDs emit light via current application to the organic layer, and the light is extracted through the anode and the transparent substrate.

The light emitting elements, which are OLEDs, are uniform in terms of shape, size, material, and so on as described above, but each emit a different light amount even via application of a unique drive current. Also, as an accumulated light emission period increases, the light emission amount of the light emitting elements decreases, in other words, the light emitting elements deteriorate. Thus, it is necessary to correct unevenness in light emission amount among the light emitting elements.

Furthermore, as shown in FIG. 3C, a surface of the TFT substrate 180, on which the light emitting elements are arranged in a lattice arrangement, functions as a sealing area, and has attached thereto the sealing plate 181 via a space frame 183. This configuration seals the sealing area with dry nitrogen or the like enclosed therein in order to avoid exposure to an external air. Note that a moisture absorbent may be further enclosed in the sealing area for moisture absorption. Also, the sealing plate 181 may be for example a sealing glass, or may be made of a material other than glass.

(b) TFT Layer of TFT Substrate 180

Figure 6:
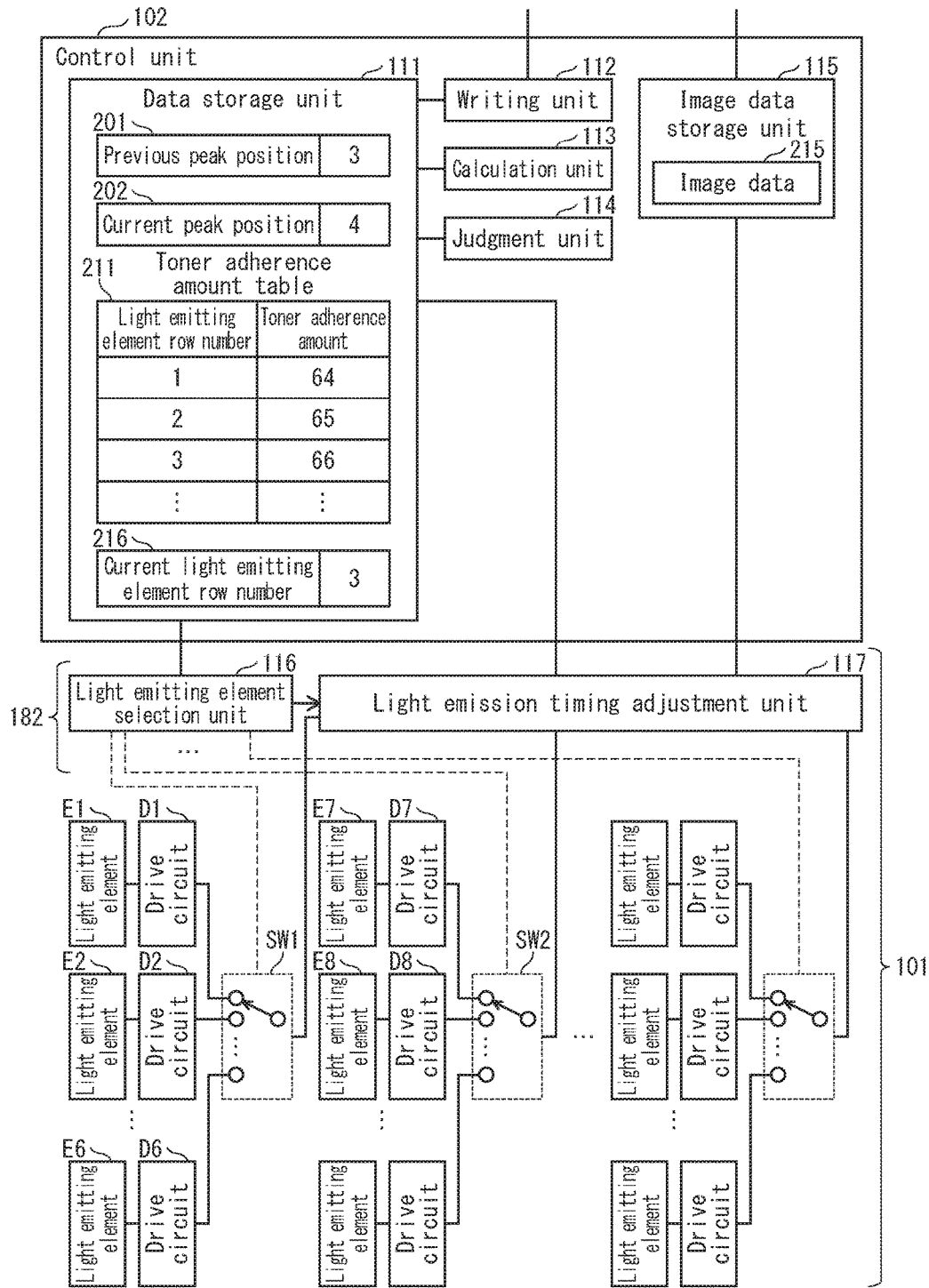
FIG. 6 is a block diagram showing functional configurations of the optical writing unit 101 and a control unit 102.

In the TFT layer of the TFT substrate 180, a TFT circuit is formed. As shown in FIG. 6, the TFT circuit includes light emitting elements E1, E2, E6, E7, E8, . . . , which constitute the light emitting element array 107, and drive circuits D1, D2, . . . , D6, D7, D8, . . . . The light emitting elements E1, E2, E6, E7, E8, . . . are equal in number to and correspond one-to-one to the drive circuits D1, D2, . . . , D6, D7, D8, . . . .

The TFT circuit further includes switch circuits SW1, SW2, . . . that are equal in number to light emitting elements included in each of the light emitting element rows of the light emitting element array 107. The switch circuits each correspond to six drive circuits and six light emitting elements. For example, the switch circuit SW1 corresponds to six drive circuits D1, D2, . . . , D6 and six light emitting elements E1, E2, . . . , E6. The switch circuits each receive, from the driver IC 182, a luminance signal and an instruction of selecting a light emitting element for light emission among the six light emitting elements. The switch circuit outputs the received luminance signal to a drive circuit corresponding to the light emitting element indicated by the instruction among the six drive circuits.

Figure 4:
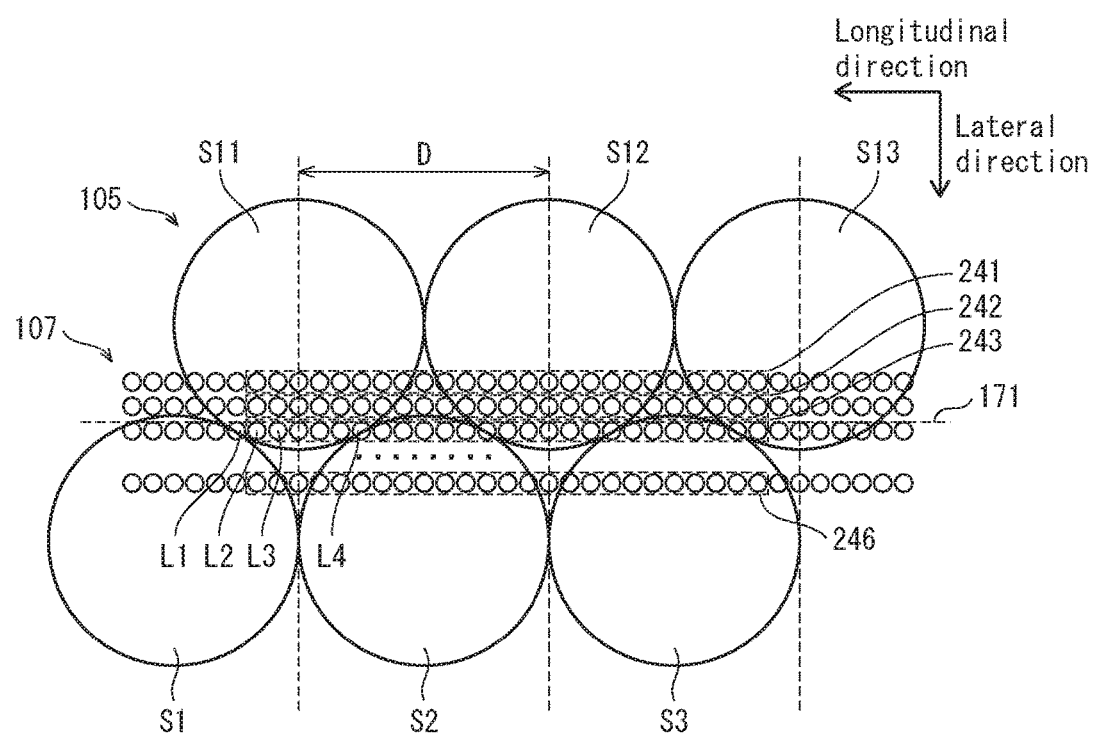
FIG. 4 schematically shows a positional relation between a light emitting element array 107 and a rod lens array 105.

Here, six light emitting elements shown in FIG. 6, which correspond to each of the switch circuits, correspond to any six light emitting elements that are arranged in line in the lateral direction among the light emitting elements of the light emitting element array 107 shown in FIG. 4.

The drive circuits each generate a drive current according to the received luminance signal, and supply the generated drive current to a corresponding one of the light emitting elements.

The light emitting elements each emit light by the supplied drive current.

Optical beam emitted from the light emitting element is condensed by the rod lens array 105 onto the outer circumferential surface of the photosensitive drum 103 shown in FIG. 1.

(2) Rod Lens Array 105

FIG. 4 schematically shows, when the writing unit 101 is viewed from the photosensitive drum 103, a positional relation between the light emitting element array 107 and the rod lens array 105 in the main scanning direction.

The rod lens array 105 is longitudinal in the main scanning direction, and is disposed so as to condense light emitted from the light emitting element array 107 onto the outer circumferential surface of the photosensitive drum 103. The rod lens array 105 has light condensing efficiency that is different depending on a position therein in the sub scanning direction.

As shown in FIG. 4, the rod lens array 105 is constituted from columnar rod lenses S1, S2, S3, . . . , S11, S12, S13, . . . (optical elements in claims) that are arranged in two rows and in a staggered arrangement in the main scanning direction.

In a first row, the rod lenses S1, S2, S3, . . . are arranged such that a straight line connecting center points thereof runs in the main scanning direction. In a second row, the rod lenses S11, S12, S13, . . . are arranged such that a straight line connecting center points thereof runs in the main scanning direction.

Here, the center point of each of the rod lenses indicates a point through which a central axis of the rod lens passes on a circular edge surface of the rod lens.

The rod lens S11 of the second row is arranged so as to have a center point on a line extending in the sub scanning direction from a contact point between the rod lenses S1 and S2 of the first row. With this configuration, the rod lenses S1 and S2 contact each other at substantially a single point, the rod lenses S1 and S11 contact each other at substantially a single point, and the rod lenses S2 and S11 contact each other at substantially a single point.

The rod lens S2 of the first row is arranged so as to have a center point on a line extending in the sub scanning direction from a contact point between the rod lenses S11 and S12 of the second row. With this configuration, the rod lenses S11 and S12 contact each other at substantially a single point, the rod lenses S2 and S11 contact each other at substantially a single point, and the rod lenses S2 and S12 contact each other at substantially a single point. Further, other rod lenses are arranged in the same manner as above.

The rod lens array 105 is disposed such that a center line 171 is substantially parallel to the center line 187 of the light emitting element array 107 (FIG. 3D). The center line 171 connects contact points between the rod lenses of the first row and the rod lenses of the second row that are adjacent to each other.

Note that the rod lenses of the first row are each offset by half a lens diameter D of each of the rod lenses in the main scanning direction from any of the rod lenses of the second row which contacts the rod lens of the first row.

The rod lenses have effects of bending light ray by refractive index distribution to condense light. The lens diameter D of each of the rod lenses is larger than a diameter of each of the light emitting elements. Also, the rod lenses have properties that transmissivity differs depending on an incident position of optical beam. For this reason, light condensing efficiency by the rod lens array 105 on the outer circumferential surface of the photosensitive drum 103 differs depending on a position of the rod lens array 105 relative to the light emitting element array 107 in the lateral direction.

(3) Positional Relation Between Light Emitting Element Array and Rod Lens Array

The positional relation between the light emitting element array 107 and the rod lens array 105 is determined such that the center line 187 of the light emitting element array 107 shown in FIG. 3D is substantially parallel to the center line 171 shown in FIG. 4.

As shown in FIG. 2, optical beam, which is emitted from the light emitting elements of the light emitting element array 107, transmits through the rod lens array 105 and thus is condensed. This forms a beam spot on the outer circumferential surface of the photosensitive drum 103.

Also, as shown in FIG. 4, when the writing unit 101 is viewed from the photosensitive drum 103, each of the rod lenses corresponds in position to light emitting elements such that the light emitting elements are enclosed in the lens diameter of the rod lens and some of the enclosed light emitting elements extend over the lens diameter of an adjacent rod lens. Optical beam, which is emitted from each of the light emitting elements enclosed in the lens diameter of the rod lens, enters a different part of the rod lens.

Specifically, the light emitting elements L1, L2, L3, and L4 are enclosed in the lens diameter of the rod lens S11. Of these light emitting elements, part of the light emitting element L1 is enclosed in the lens diameter of the rod lens S1, and part of the light emitting element L4 is enclosed in the lens diameter of the rod lens S2. Further, optical beam, which is emitted from each of the light emitting elements L1, L2, L3, and L4 enclosed in the lens diameter of the rod lens S11, transmits through a different part of the rod lens S11, and thus is condensed. This forms a beam spot on the outer circumferential surface of the photosensitive drum 103.

(4) Driver IC 182

As shown in FIGS. 3A and 3C, the driver IC 182 is mounted on an area other than the sealing area of the TFT substrate 180. The driver IC 182 is connected to the control unit 102 via a flexible wire 185.

As shown in FIG. 6, the driver IC 182 includes a light emitting element selection unit 116, a light emission timing adjustment unit 117, and other circuits.

The driver IC 182 may be for example composed of a ROM, a RAM, a processor, and so on. The ROM may store therein a computer program for control, and the processor may operate in accordance with the computer program for control. Functions of the light emitting element selection unit 116 and the light emission timing adjustment unit 117 may be achieved by the processor operating in accordance with the computer program for control.

The driver IC 182 receives a current mode, a current light emitting element row number, and target image data from the control unit 102.

(a) Light Emitting Element Selection Unit 116

The light emitting element selection unit 116 receives the current mode and the current light emitting element row number from the control unit 102.

(Print Mode)

In the case where the received mode is the print mode, the light emitting element selection unit 116 instructs each of all the switch circuits SW1, SW2, . . . , to select a light emitting element included in a light emitting element row identified by the received current light emitting element row number among the six light emitting element rows of the light emitting element array 107. In other words, the light emitting element selection unit 116 instructs each of all the switch circuits SW1, SW2, . . . , to select, from among the six light emitting elements corresponding to the switch circuit, a light emitting element that is included in the light emitting element row identified by the received current light emitting element row number. Further, simultaneously with output of the instruction of selecting the light emitting element to the switch circuits, the light emitting element selection unit 116 instructs the light emission timing adjustment unit 117 to output a luminance signal according to image data 215 stored in an image data storage unit 115.

(Test Mode)

In the case where the received mode is the test mode, the light emitting element selection unit 116 instructs, under control by the control unit 102, each of all the switch circuits SW1, SW2, . . . to select one of the six light emitting elements corresponding to the switch circuit, according to the image data 215 stored in the image data storage unit 115. Further, simultaneously with output of the instruction of selecting the light emitting element to the switch circuits, the light emitting element selection unit 116 instructs the light emission timing adjustment unit 117 to output a luminance signal according to the image data 215 stored in the image data storage unit 115.

Next, the following describes the case where 20 consecutive light emitting elements, for example 1st to 20th light emitting elements, are selected from each of the six light emitting element rows of the light emitting element array 107. Here, selection of light emitting elements is performed such that toner images, which are formed on the intermediate transfer belt 31 through the process of exposure of the light emitting elements, image formation, and primary transfer, are positioned within a sensing range of the sensor 35. Also, the number of light emitting elements to be selected is determined such that the light emitting elements are enclosed in the lens diameter D of at least one of the rod lenses.

In short, for each of the light emitting element rows of the light emitting element array 107, the light emitting element selection unit 116 selects light emitting elements emitting light passing through at least specific one of the rod lenses among all the light emitting elements of the light emitting element row.

FIG. 4 shows for example light emitting element groups 241, 242, 243, . . . , 246 each of which is constituted from light emitting elements selected for each of the light emitting element rows by the light emitting element selection unit 116.

When the writing unit 101 is viewed from the photosensitive drum 103, the light emitting elements, which constitute the light emitting element group 241, exist across the rod lens S12 in the longitudinal direction. The same applies to the light emitting element groups 242 and 243. Also, the light emitting elements, which constitute the light emitting element group 244, exist across the rod lens S2 in the longitudinal direction.

Exposure amounts (toner adherence amounts in claims) are acquired by light emission from the light emitting element groups selected in this way. A peak exposure amount among the acquired exposure amounts is used to detect a positional shift of the light emitting element rows relative to the rod lens array 105 in the lateral direction. This allows to sense the positional shift of the light emitting element array 107 relative to the rod lens array 105 in the sub scanning direction.

(b) Light Emission Timing Adjustment Unit 117

The light emission timing adjustment unit 117 reads a pixel value (luminance signal) for each line from the image data 215 stored in the image data storage unit 115. Also, the light emission timing adjustment unit 117 receives a luminance signal output instruction from the light emitting element selection unit 116. Upon receiving the luminance signal output instruction, the light emission timing adjustment unit 117 outputs a luminance signal to one of the switch circuits corresponding to the luminance signal at the same time.

(5) Example of Formed Toner Images

Figure 5A:
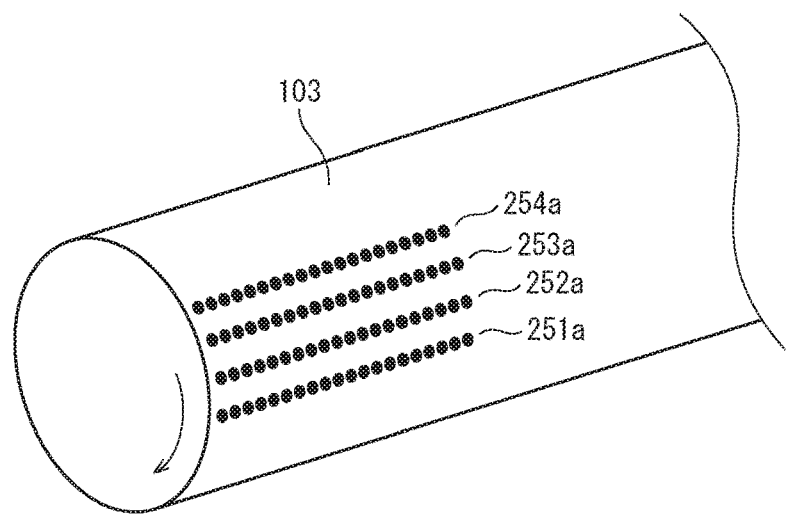
FIG. 5A shows an example of toner images that are formed on an outer circumferential surface of a photosensitive drum 103.

FIG. 5A shows an example of toner images that are formed on the outer circumferential surface of the photosensitive drum 103 in the test mode under control by the light emitting element selection unit 116 and the light emission timing adjustment unit 117. Also, FIG. 5B shows an example of toner images that are formed on the intermediate transfer belt 31.

As shown in FIG. 5A, toner images 251a, 252a, 253a, and 254a are formed on the outer circumferential surface of the photosensitive drum 103, and are each composed of toner adherence regions that are arranged in line. The toner images 251a, 252a, 253a, and 254a are respectively formed by light emission from the light emitting element groups 241, 242, 243, . . . shown in FIG. 4. The light emitting element groups 241, 242, 243, . . . shown in FIG. 4 emit light in the stated order, and accordingly the toner images 251a, 252a, 253a, and 254a are formed on the outer circumferential surface of the photosensitive drum 103 in the stated order.

Figure 5B:
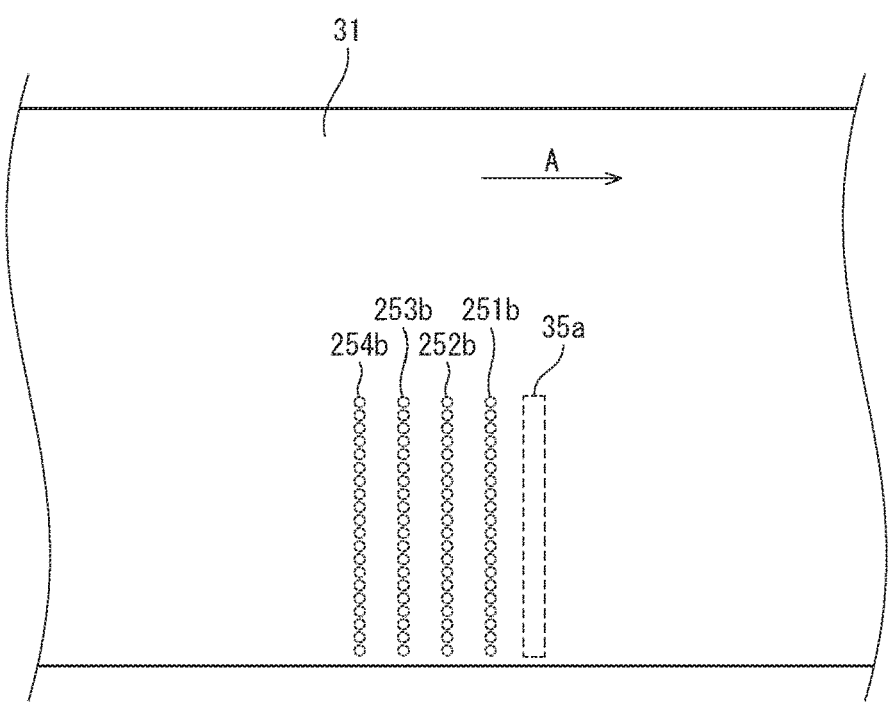
FIG. 5B shows an example of toner images that are formed on an intermediate transfer belt 31.

Also, as shown in FIG. 5B, toner images 251b, 252b, 253b, and 254b are formed on the intermediate transfer belt 31. Here, a surface of the intermediate transfer belt 31 shown in FIG. 5B is a back side opposite to a surface on which the toner images are formed. The toner images 251b, 252b, 253b, and 254b are transferred from the photosensitive drum 103 and respectively correspond to the toner images 251a, 252a, 253a, and 254a. The toner images 251b, 252b, 253b, and 254b are formed on the intermediate transfer belt 31 in the stated order. Also, a range 35a indicates the sensing range of the sensor 35. When the intermediate transfer belt 31 rotates and thus the toner images 251b, 252b, 253b, and 254b each fall within the range 35a, the sensor 35 senses a toner adherence amount of the toner image.

1.3 Control Unit 102

The control unit 102 shown in FIG. 1 is for example an application-specific integrated circuit (ASIC) including an operation circuit, a control circuit, a semiconductor memory, and so on, and is connected to the driver IC 182 shown in FIG. 3.

The control unit 102 may be for example composed of a ROM, a RAM, a processor, and so on. The ROM may store therein a computer program for control, and the processor may operate in accordance with the computer program.

The control unit 102 controls the image forming units 21Y, 21M, 21C, and 21K shown in FIG. 1 to form toner images of Y, M, C, and K colors, respectively.

Also, as shown in FIG. 6, the control unit 102 is composed of a data storage unit 111, a writing unit 112, a calculation unit 113, a judgment unit 114, and the image data storage unit 115.

Here, the data storage unit 111 and the image data storage unit 115 are each for example is composed of a semiconductor memory. Also, the writing unit 112, the calculation unit 113, the judgment unit 114 may be each composed of a dedicated operation circuit and a control circuit.

In the case where the control unit 102 is composed of a ROM, a RAM, a processor, and so on, functions of the writing unit 112, the calculation unit 113, and the judgment unit 114 may be achieved by the processor operating in accordance with the computer program for control.

The control unit 102 outputs the current mode, the current light emitting element row number, and the target image data to the driver IC 182.

(1) Data Storage Unit 111

As shown in FIG. 6, the data storage unit 111 stores therein a previous peak position 201 (reference position at reference time in claims), a current light emitting element row number 216, and a current mode (not illustrated). The data storage unit 111 also has a storage region for a current peak position 202 and a toner adherence amount table 211.

The previous peak position 201 indicates a light emitting element row number that has been determined to a peak position, which will be described later, in a previous measurement of toner adherence amount. Here, it is defined that measurement of toner adherence amount is to be performed in predetermined intervals such as once a month. The previous measurement in this case indicates a measurement performed one month before.

The current peak position 202 indicates a light emitting element row number identifying a light emitting element row that is determined to a peak position in a current measurement of toner adherence amount.

The toner adherence amount table 211 is a data table for storing toner adherence amounts acquired in the current measurement of toner adherence amount. The toner adherence amount table 211 is composed of pairs of light emitting element row number and toner adherence amount as shown in FIG. 6. The pairs each correspond to a light emitting element row. The light emitting element row number indicates a number identifying a light emitting element row. The toner adherence amount indicates a toner adherence amount acquired in measurement with respect to the light emitting element row.

The current light emitting element row number 216 indicates a number identifying a light emitting element row whose position relative to the rod lens array 105 is currently the optimal.

The current mode indicates the print mode or the test mode.

(2) Image Data Storage Unit 115

The image data storage unit 115 stores therein the image data 215 as shown in FIG. 6 as an example. The image data 215 is used in the print mode as data representing an image a user hopes to form. The image data 215 is also used in the test mode as data representing a test image for detecting a positional shift between the rod lens array 105 and the light emitting element array 107.

The image data 215 is image data reproduced in two tones, and has pixel values that are each zero or one. Halftone is reproduced by an appearance pattern of zero and one in the image data 215. In this case, the image data 215 is generated for example by image processing with use of a dither method or the like on image data reproduced in multiple tones.

In the test mode, the image data 215 is used to form toner images such as shown in FIGS. 5A and 5B.

(3) Writing Unit 112

In the test mode, the writing unit 112 operates.

Upon receiving a toner adherence amount from the sensor 35, the writing unit 112 writes the received toner adherence amount and a light emitting element row number in pairs into the toner adherence amount table 211.

The writing unit 112 writes a currently determined peak position as the current peak position 202 into the data storage unit 111. The current peak position 202, which is written into the data storage unit 111, is used in a subsequent test mode as the previous peak position.

When the peak position changes, the writing unit 112 writes, as the current light emitting element row number 216, a light emitting element row number indicated by the current peak position, into the data storage unit 111.

FIG. 8 shows, at an upper stage, a light emitting element row 231 that has been previously selected in the light emitting element array 107. The current light emitting element row number 216 before updating indicates the light emitting element row 231.

Also, FIG. 8 shows, at a lower stage, a light emitting element row 232 in the light emitting element array 107 after change of the peak position such as described above. The current light emitting element row number 216 after updating indicates the light emitting element row 232. Subsequently, the light emitting element row 232 is used for exposure. A positional shift of the light emitting element row 232 relative to the rod lens array 105 is currently the smallest among the light emitting element rows of the light emitting element array 107. Thus, the light emitting element row 232 is the optimal light emitting element row.

(4) Calculation Unit 113

In the test mode, the calculation unit 113 operates.

The calculation unit 113 selects the highest one among the toner adherence amounts stored in the toner adherence amount table 211. The selected highest toner adherence amount indicates a peak value (local maximum). Also, the calculation unit 113 determines, as the peak position, a light emitting element row number identifying a light emitting element row corresponding to the peak value with reference to the toner adherence amount table 211.

FIG. 7 shows a graph 220 plotting the toner adherence amounts that are acquired for the light emitting element rows by the sensor 35. In the figure, the horizontal axis represents the light emitting element row number, and the vertical axis represents the toner adherence amount.

The calculation unit 113 for example calculates a curved line 227 connecting points 221, 222, . . . , 226 which are plotted in the graph 220. The curved line 227 expresses a distribution of the toner adherence amounts in the lateral direction of the light emitting element array 107. Next, the calculation unit 113 for example selects the highest (peak) toner adherence amount among the toner adherence amounts indicated by the curved line 227. In the graph 220, the point 224 indicates the highest toner adherence amount, and accordingly is selected for example. Also, the point 224 corresponds to a light emitting element row number "4", and accordingly the light emitting element row number "4" is determined to the peak position.

Here, the calculation unit 113 calculates, as the light emitting element row number determined as the peak position, for example a real value such as "4.11", "4.12", and "4.13" as well as an integer value such as "1", "2", and "3".

(5) Judgment Unit 114

In the test mode, the judgment unit 114 operates.

The judgment unit 114 reads the previous peak position 201 from the data storage unit 111. Next, the judgment unit 114 calculates a difference between the current peak position 202 and the previous peak position 201, and judges whether the current peak position 202 coincides with the previous peak position 201 by judging whether the calculated difference is less than a threshold value. Here, the threshold value is a sufficiently small value relative to a distance between each two light emitting elements that are adjacent in the lateral direction. The threshold value is for example $\frac{1}{100}$, $\frac{1}{200}$, $\frac{1}{300}$, $\frac{1}{500}$, or the like of the distance between each two light emitting elements which are adjacent in the lateral direction. In the case where the calculated difference is less than the threshold value, the judgment unit 114 judges that the current peak position 202 coincides with the previous peak position 201. Meanwhile, in the case where the calculated difference is equal to or greater than the threshold value, the judgment unit 114 judges that the current peak position 202 does not coincide with the previous peak position 201.

When judging that the current peak position 202 does not coincide with the previous peak position 201, the judgment unit 114 detects the calculated difference as a positional shift in the lateral direction between the light emitting element array 107 and the rod lens array 105 relative to the previous positional relation therebetween.

1.4 Operations of Image Forming Device 10

Figure 9:
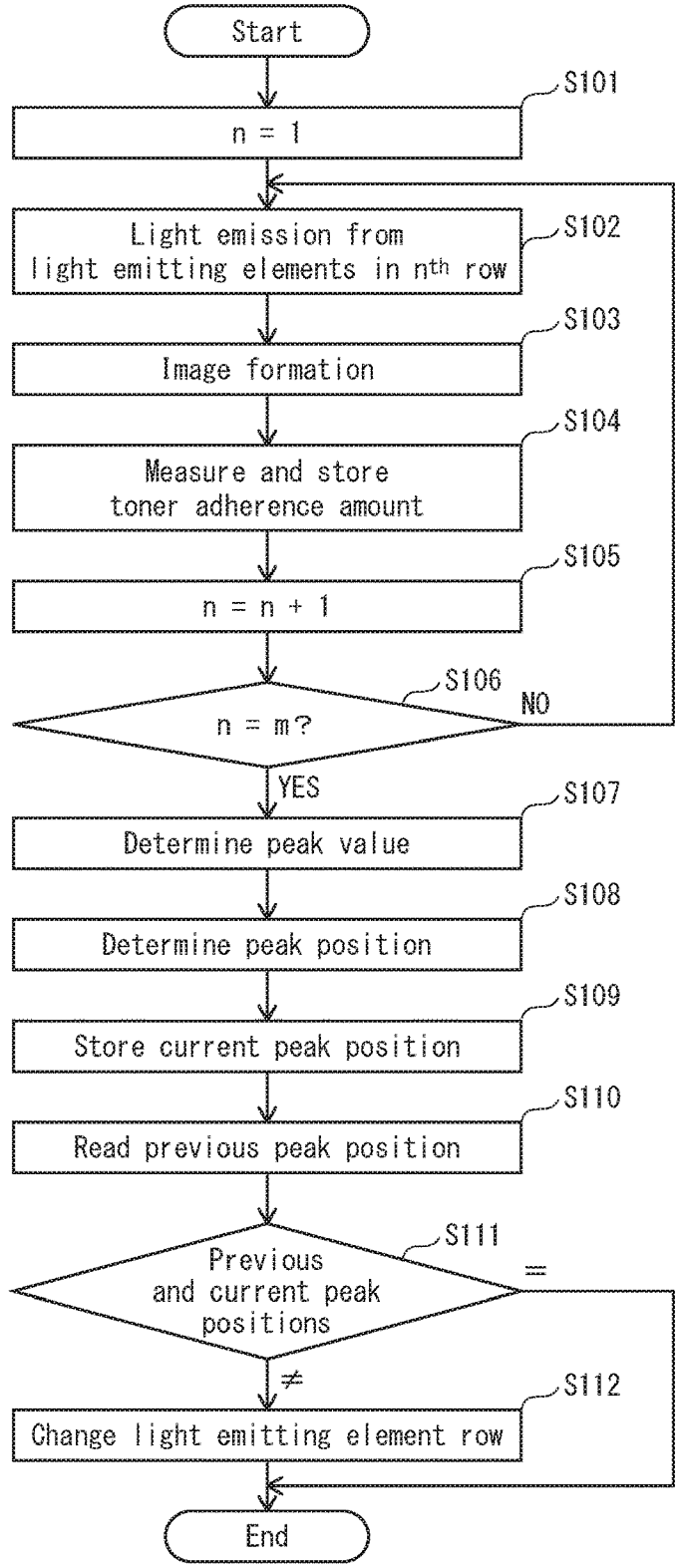
FIG. 9 is a flow chart showing operations performed by the image forming device 10.

The following describes the operations performed by the image forming device 10 in the test mode, with reference to a flow chart in FIG. 9.

The light emitting element selection unit 116 sets, as an initial value, a variable n, which indicates a light emitting element row number identifying a light emitting element row, to "1" (Step S101).

Next, the light emitting element selection unit 116 selects 1st to 20th light emitting elements from the light emitting element row identified by the light emitting element row number indicated by the variable n, and causes the selected light emitting elements to emit light (Step S102). Toner images are formed on the outer circumferential surface of the photosensitive drum 103, and then the formed toner images are primarily transferred onto the intermediate transfer belt 31 (Step S103).

The sensor 35 acquires a toner adherence amount of each of the toner images formed on the intermediate transfer belt 31, and outputs the acquired toner adherence amount to the control unit 102. The writing unit 112 receives the toner adherence amount from the sensor 35, and writes the light emitting element row number and the received toner adherence amount in pairs into the toner adherence amount table 211 (Step S104).

The light emitting element selection unit 116 increments the variable n by "1" (Step S105), and judges whether the variable n is equal to a predetermined value m (Step S106). Here, the predetermined value m indicates the maximum number of the light emitting element rows.

In the case where the variable n is not equal to the predetermined value m (Step S106: NO), the control unit 102 returns to Step S102 to repeat the processing.

In the case where the variable n is equal to the predetermined value m (Step S106: YES), the calculation unit 113 selects the highest one among the toner adherence amounts stored in the toner adherence amount table 211. The selected highest toner adherence amount indicates a peak value (Step S107). Next, the calculation unit 113 determines, as a peak position, a light emitting element row number of a light emitting element row corresponding to the peak value with reference to the toner adherence amount table 211 (Step S108).

The writing unit 112 writes the determined peak position as the current peak position 202 into the data storage unit 111 (Step S109).

The judgment unit 114 reads the previous peak position 201 from the data storage unit 111 (Step S110). Next, the judgment unit 114 compares the current peak position 202 with the previous peak position 201 (Step S111).

In the case where the current peak position 202 does not coincide with the previous peak position 201 (Step S111: ≠), the control unit 102 changes the light emitting element row for light emission from the light emitting element row identified by the light emitting element row number indicated by the previous peak position 201 to a light emitting element row identified by a light emitting element row number indicated by the current peak position 202. The writing unit 112 writes, as the current light emitting element row number 216, the light emitting element row number indicated by the current peak position 202 into the data storage unit 111 (Step S112). In the case where the current peak position 202 coincides with the previous peak position 201 (Step S111: =), the control unit 102 does not change the light emitting element row for light emission.

This completes the operations performed by the image forming device 10 in the test mode.

1.5 Outline

The light condensing efficiency on the outer circumferential surface of the photosensitive drum 103 differs depending on which position in the rod lens array 105 in the lateral direction an optical beam emitted from each of the light emitting elements of the light emitting element array 107 passes through. Due to this, the exposure amount on the outer circumferential surface of the photosensitive drum 103 varies according to the position in the rod lens array 105 in the lateral direction the optical beam passes through.

In view of this, it is possible to specify a position in the rod lens array 105 in the lateral direction an optical beam emitted from each of the light emitting elements has passed through, with use of exposure amounts on the outer circumferential surface of the photosensitive drum 103 that are acquired by emission of a constant light amount from the light emitting elements. In other words, with respect to a light emitting element that has emitted an optical beam corresponding to a predetermined exposure amount on the outer circumferential surface of the photosensitive drum 103, it is possible to specify a position of the light emitting element in the lateral direction in the rod lens array 105.

In the present embodiment, light emitting elements, which are arranged in the longitudinal direction for each of the light emitting element rows of the light emitting element array 107, are caused to emit a constant light amount. A distribution of exposure amounts on the outer circumferential surface of the photosensitive drum 103 is calculated, and a position in the distribution corresponding to a predetermined exposure amount is calculated. The calculated position in the distribution corresponds to a position in the lateral direction in the rod lens array 105. Here, the predetermined exposure amount indicates a peak value in the distribution.

The calculated position is compared with the reference position, thus detecting a positional shift in the sub scanning direction between the rod lens array 105 and the light emitting element array 107.

2 Modification (1)

The following describes a control unit and an optical writing unit relating to a modification (1) of the above embodiment.

The control unit and the optical writing unit relating to the modification (1) respectively have the similar configurations to those of the control unit 102 and the optical writing unit 101 relating to the above embodiment. The following description focuses differences from the above embodiment.

In the modification (1), the image forming device detects a positional shift in the main scanning direction between the rod lens array 105 and the light emitting element array 107, then detects a positional shift in the sub scanning direction therebetween, and changes the light emitting element row for light emission in the light emitting element array 107 based on the detected positional shifts. Here, the modification (1) differs from the above embodiment in terms of a method of detecting a positional shift in the sub scanning direction between the rod lens array 105 and the light emitting element array 107.

2.1 Detection of Positional Shift in Main Scanning Direction (1) Light emitting element selection unit 116

In the test mode, in order to sense a positional shift in the main scanning direction between the rod lens array 105 and the light emitting element array 107, the light emitting element selection unit 116 selects, under control by the control unit 102, one specific light emitting element row among the six light emitting element rows of the light emitting element array 107. Next, the light emitting element selection unit 116 instructs each of the switch circuits to select 20 consecutive light emitting elements, for example 10th to 29th light emitting elements from the selected certain light emitting element row. Here, selection of light emitting elements is performed such that toner images, which are formed on the intermediate transfer belt 31 through the process of exposure of the light emitting elements, image formation, and primary transfer, are positioned within a sensing range of the sensor 35. Also, the number of light emitting elements to be selected is determined such that the light emitting elements are enclosed in the lens diameter D of at least one of the rod lenses.

In short, for each of the light emitting element rows of the light emitting element array 107, the light emitting element selection unit 116 selects light emitting elements emitting light passing through at least specific one of the rod lenses among all the light emitting elements of the light emitting element row.

Figure 10:
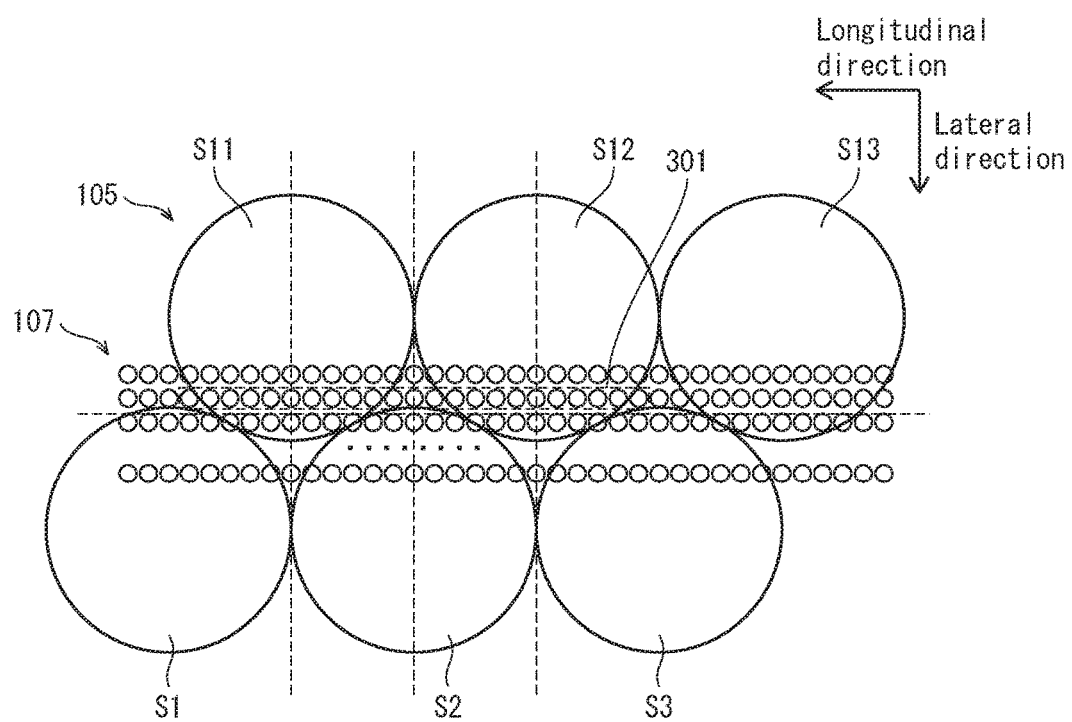
FIG. 10 schematically shows light emitting elements for light emission that are arranged in a longitudinal direction in the light emitting element array 107.

FIG. 10 shows for example a light emitting element group 301 that is constituted from light emitting elements selected from one of the light emitting element rows by the light emitting element selection unit 116.

The light emitting element group 301 is selected such that the light emitting elements are enclosed in the lens diameter D of at least the rod lens S11.

An exposure amount (toner adherence amount) is acquired by light emission from each of the light emitting element groups selected in this way. It is possible to sense a positional shift of the light emitting element rows relative to the rod lens array 105 in the longitudinal direction, with use of a peak exposure amount among the acquired exposure amounts. This allows to sense the positional shift of the light emitting element array 107 relative to the rod lens array 105 in the main scanning direction.

(2) Example of Formed Toner Images

Figure 11A:
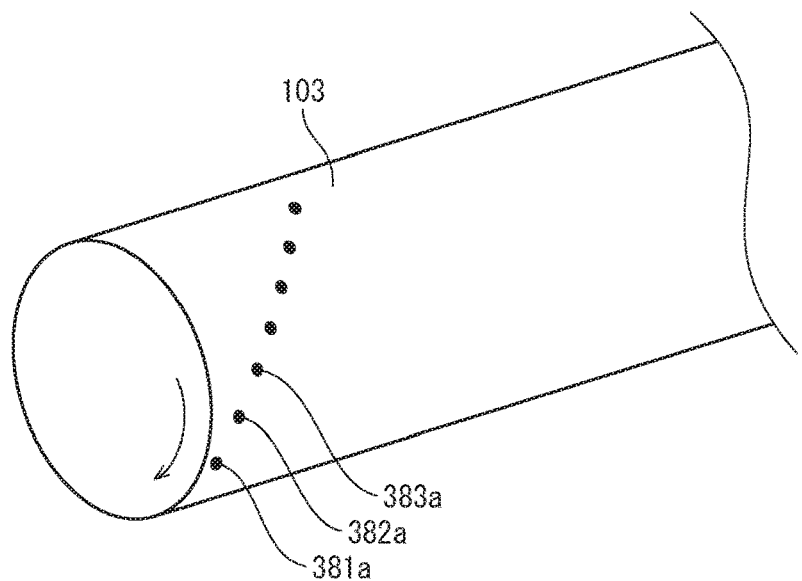
FIG. 11A shows an example of toner images that are formed on the outer circumferential surface of the photosensitive drum 103.

FIG. 11A shows an example of toner images that are formed on the outer circumferential surface of the photosensitive drum 103 in the test mode under control by the light emitting element selection unit 116 and the light emission timing adjustment unit 117. Also, FIG. 11B shows an example of toner images that are formed on the intermediate transfer belt 31.

As shown in FIG. 11A, toner images 381*a*, 382*a*, 383*a*, . . . are formed on the outer circumferential surface of the photosensitive drum 103, and are each composed of a single toner adherence region. The toner images 381*a*, 382*a*, 383*a*, . . . are formed by light emission from the respective light emitting elements included in the light emitting element group 301 shown in FIG. 10. The light emitting elements included in the light emitting element group 301 shown in FIG. 10 emit light in the arrangement order, and accordingly the toner images 381*a*, 382*a*, 383*a*, . . . are formed on the outer circumferential surface of the photosensitive drum 103 in the stated order.

Figure 11B:
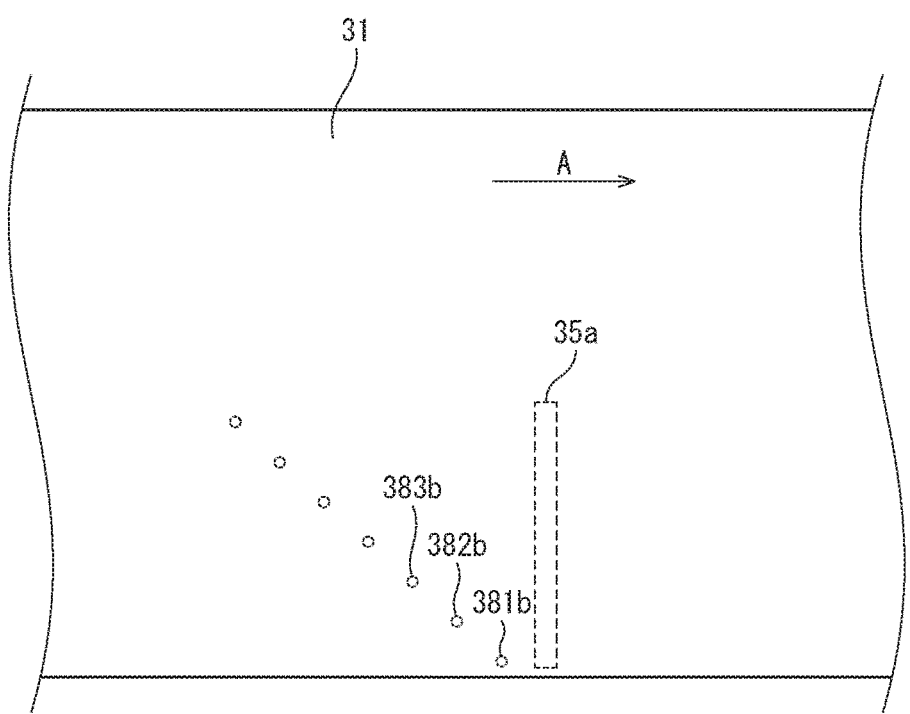
FIG. 11B shows an example of toner images that are formed on the intermediate transfer belt 31.

Also, as shown in FIG. 11B, toner images 381*b*, 382*b*, 383*b*, . . . are formed on the intermediate transfer belt 31. Here, a surface of the intermediate transfer belt 31 shown in FIG. 11B is a back side opposite to a surface on which the toner images are formed. The toner images 381*b*, 382*b*, 383*b*, . . . are transferred from the photosensitive drum 103 and respectively correspond to the toner images 381*a*, 382*a*, 383*a*, . . . . The toner images 381*b*, 382*b*, 383*b*, . . . are formed on the intermediate transfer belt 31 in the stated order. Also, a range 35*a* indicates the sensing range of the sensor 35. When the intermediate transfer belt 31 rotates and thus the toner images 381*b*, 382*b*, 383*b*, . . . each fall within the range 35*a*, the sensor 35 senses a toner adherence amount of the toner image.

(3) Longitudinal-Directional Toner Adherence Amount Table 311

Figures 12, 13:
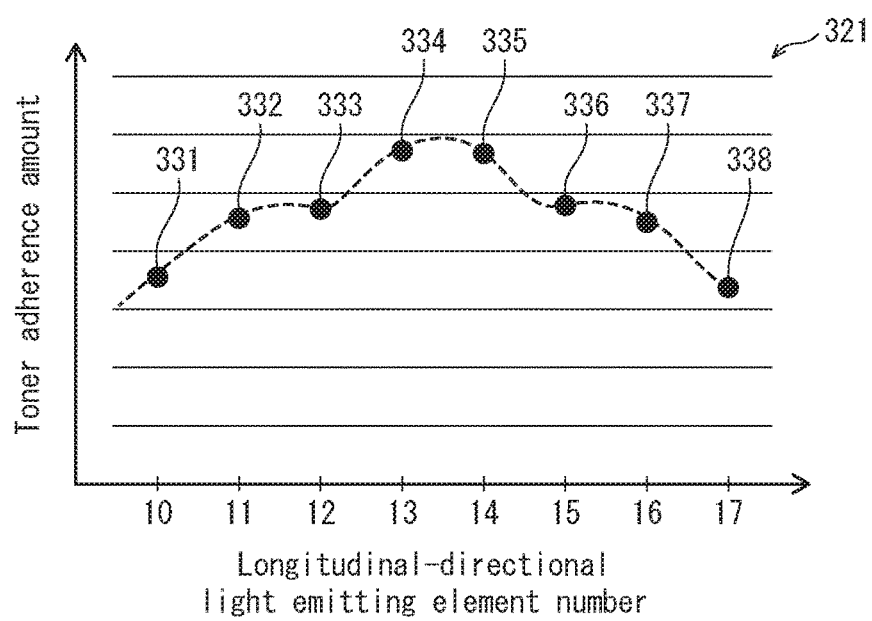
FIG. 12 shows an example of a longitudinal-directional toner adherence amount table.
FIG. 13 is a graph showing a relation between longitudinal-directional light emitting element number and toner adherence amount.

The data storage unit 111 has a storage region for a longitudinal-directional toner adherence amount table 311 as shown in FIG. 12 as an example.

The longitudinal-directional toner adherence amount table 311 is a data table for storing toner adherence amounts acquired in the current measurement of toner adherence amount in the longitudinal direction. The longitudinal-directional toner adherence amount table 311 is composed of pairs of light emitting element number and toner adherence amount as shown in FIG. 12. The pairs each correspond to a selected light emitting element. The toner adherence amount indicates a toner adherence amount in the longitudinal direction acquired in a measurement for the light emitting element.

(4) Writing Unit 112

Upon receiving a toner adherence amount corresponding to each of selected light emitting elements from the sensor 35, the writing unit 112 writes the received toner adherence amount and a light emitting element number in pairs into the longitudinal-directional toner adherence amount table 311.

(5) Calculation Unit 113

The calculation unit 113 selects the highest one among the toner adherence amounts stored in the longitudinal-directional toner adherence amount table 311. The selected highest toner adherence amount indicates a peak value. Also, the calculation unit 113 determines, as a peak position, a light emitting element number identifying a light emitting element corresponding to the peak value with reference to the longitudinal-directional toner adherence amount table 311.

FIG. 13 shows a graph 321 plotting the toner adherence amounts that are acquired for the respective light emitting elements by the sensor 35. In the figure, the horizontal axis represents the longitudinal-directional light emitting element number, and the vertical axis represents the toner adherence amount.

The calculation unit 113 for example selects the highest one among the toner adherence amounts indicated by points 331, 332, . . . , 338 that are plotted in the graph 321. Specifically, the point 334 is selected. Also, the point 334 corresponds to a light emitting element number "13", and accordingly the light emitting element number "13" is determined to the peak position.

2.2 Detection of Positional Shift in Sub Scanning Direction (1) Light Emitting Element Selection Unit 116

In the test mode, in order to sense a positional shift in the sub scanning direction between the rod lens array 105 and the light emitting element array 107, the light emitting element selection unit 116 instructs, under control by the control unit 102, the switch circuits to select a first light emitting element group and a second light emitting element group that are arranged in the sub scanning direction among the light emitting elements of the light emitting array 107. The first and second light emitting element groups are for example each constituted from six light emitting elements. Here, selection of light emitting elements is performed such that toner images, which are formed on the intermediate transfer belt 31 through the process of exposure of the light emitting elements, image formation, and primary transfer, are positioned within a sensing range of the sensor 35.

Here, a light emitting element group, which is selected as the first light emitting element group, is disposed on a center line of a first rod lens. The center line extends in the lateral direction and is orthogonal to an optical axis of the first rod lens. Also, a light emitting element group, which is selected as the second light emitting element group, is disposed on a center line of a second rod lens. The center line extends in the lateral direction and is orthogonal to an optical axis of the second rod lens.

Figure 14:
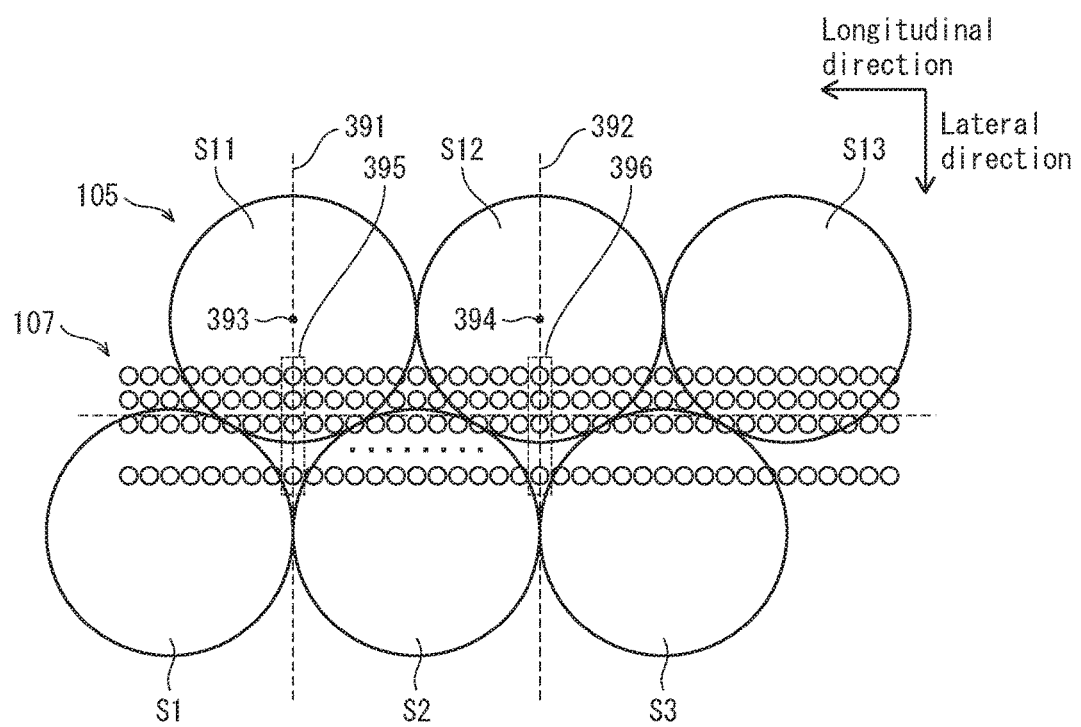
FIG. 14 schematically shows light emitting elements for light emission that are arranged in a lateral direction in the light emitting element array 107.

FIG. 14 shows for example light emitting element groups 395 and 396 that are selected by the light emitting element selection unit 116 and are each constituted from light emitting elements.

The light emitting element group 395 is disposed on a center line 391 of the rod lens S11. The center line 391 extends in the lateral direction and is orthogonal to an optical axis 393 of the rod lens S11. Also, the light emitting element group 396 is disposed on a center line 392 of the rod lens S12. The center line 392 extends in the lateral direction and is orthogonal to an optical axis 394 of the rod lens S12.

In this way, one or more light emitting element groups are selected, which are each disposed on a center line of one of the rod lenses. The center line extends in the lateral direction and is orthogonal to an optical axis of the rod lens. This allows to sense a positional shift in the sub scanning direction of the light emitting element rows relative to one or more of the rod lenses. Thus, it is possible to sense a positional shift in the sub scanning direction of the light emitting element array 107 relative to the rod lens array 105.

(2) Example of Formed Toner Images

Figure 15A:
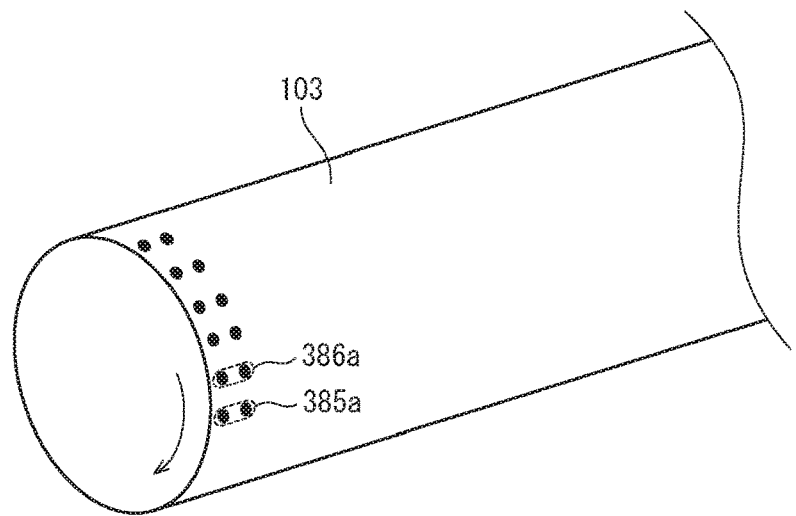
FIG. 15A shows an example of toner images that are formed on the outer circumferential surface of the photosensitive drum 103.

FIG. 15A shows an example of toner images that are formed on the outer circumferential surface of the photosensitive drum 103 in the test mode under control by the light emitting element selection unit 116 and the light emission timing adjustment unit 117. Also, FIG. 15B shows an example of toner images that are formed on the intermediate transfer belt 31.

As shown in FIG. 15A, toner images 385a, 386a, . . . are formed on the outer circumferential surface of the photosensitive drum 103, and are each composed of two toner adherence regions. The toner images 385a, 386a, . . . are formed by light emission from respective two light emitting elements included in the light emitting element groups 395 and 396 shown in FIG. 14. The light emitting elements included in the light emitting element groups 395 and 396 shown in FIG. 14 emit light two by two in the arrangement order in the lateral direction, and accordingly the toner images 385a, 386a, . . . are formed on the outer circumferential surface of the photosensitive drum 103 in the stated order.

Figure 15B:
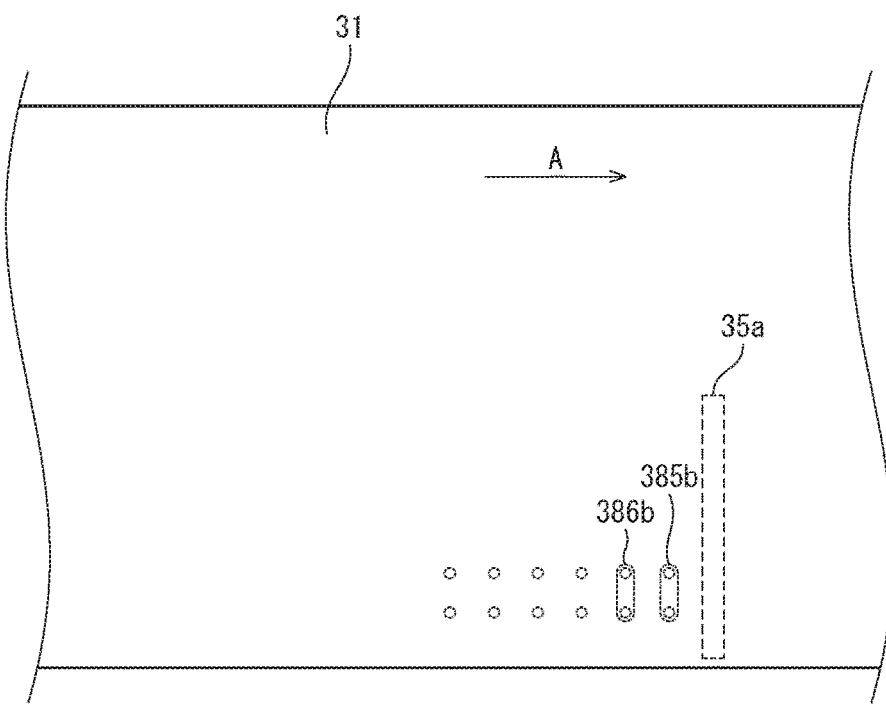
FIG. 15B shows an example of toner images that are formed on the intermediate transfer belt 31.

Also, as shown in FIG. 15B, toner images 385b, 386b, . . . are formed on the intermediate transfer belt 31. Here, the surface of the intermediate transfer belt 31 shown in FIG. 15B is a back side opposite to the surface on which the toner images are formed. The toner images 385b, 386b, . . . are transferred from the photosensitive drum 103 and respectively correspond to the toner images 385a, 386a, . . . , and are formed on the intermediate transfer belt 31 in the stated order. Also, a range 35a indicates the sensing range of the sensor 35. When the intermediate transfer belt 31 rotates and thus the toner images 385b, 386b, . . . each fall within the range 35a, the sensor 35 senses a toner adherence amount of the toner image.

(3) Previous Toner Adherence Amount Table 341 and Current Toner Adherence Amount Table 342

Figures 16, 17, 18:
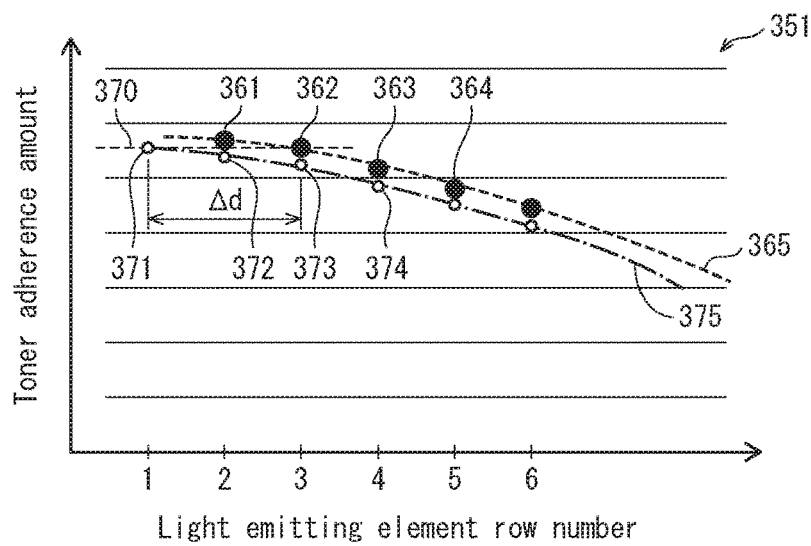
FIG. 16 shows an example of a previous toner adherence amount table.
FIG. 17 shows an example of a current toner adherence amount table.
FIG. 18 is a graph showing a relation between light emitting element row number and toner adherence amount.

The data storage unit 111 stores therein a previous toner adherence amount table 341 as shown in FIG. 16 as an example. The data storage unit 111 also stores therein a current toner adherence amount table 342 as shown in FIG. 17 as an example.

The previous toner adherence amount table 341 is a data table for storing toner adherence amounts acquired in the previous measurement of toner adherence amount. The previous toner adherence amount table 341 is composed of pairs of light emitting element row number and toner adherence amount as shown in FIG. 16. The pairs each correspond to a light emitting element row. The light emitting element row number indicates a number identifying a light emitting element row. The toner adherence amount indicates a toner adherence amount acquired in measurement with respect to the light emitting element row.

The current toner adherence amount table 342 is a data table for storing toner adherence amounts acquired in the current measurement of toner adherence amount. The current toner adherence amount table 342 is composed of pairs of light emitting element row number and toner adherence amount as shown in FIG. 17. The pairs each correspond to a light emitting element row. The light emitting element row number indicates a number identifying a light emitting element row. The toner adherence amount indicates a toner adherence amount acquired in measurement with respect to the light emitting element row.

(4) Writing Unit 112

Upon receiving a toner adherence amount from the sensor 35, the writing unit 112 writes the received toner adherence amount and a light emitting element row number in pairs into the current toner adherence amount table 342.

(5) Calculation Unit 113

The calculation unit 113 selects one toner adherence amount among the toner adherence amounts stored in the current toner adherence amount table 342, and extracts, as a first row number, a light emitting element row number corresponding to the selected toner adherence amount. Next, the calculation unit 113 extracts a toner adherence amount that is equal to the selected toner adherence amount with reference to the previous toner adherence amount table 341, and extracts, as a second row number, a light emitting element row number corresponding to the extracted toner adherence amount. Here, the calculation unit 113 calculates, as the light emitting element row number corresponding to the selected toner adherence amount, for example a real value such as "4.11", "4.12", and "4.13" as well as an integer value such as "1", "2", and "3".

FIG. 18 shows a graph 351 plotting the toner adherence amounts that are acquired for the respective light emitting element rows by the sensor 35. In the figure, the horizontal axis represents the light emitting element row number, and the vertical axis represents the toner adherence amount.

In the graph 351, points 361, 362, 363, 364, . . . correspond to the respective toner adherence amounts stored in the previous toner adherence amount table 341, for example. Meanwhile, points 371, 372, 373, 374, . . . correspond to the respective toner adherence amounts stored in the current toner adherence amount table 342, for example.

The calculation unit 113 for example calculates a curved line 375 connecting the points 371, 372, 373, 374, ... as shown in the graph 351. The curved line 375 expresses a distribution of the toner adherence amount of the light emitting element array 107 in the lateral direction. The calculation unit 113 has previously for example calculated a curved line 365 connecting the points 361, 362, 363, 364, ... as shown in the graph 351.

The calculation unit 113 for example selects a toner adherence amount 370, and extracts, as the first row number "1" (position in claims), a light emitting element row number corresponding to the point 371 that corresponds to the selected toner adherence amount 370. Next, the calculation unit 113 extracts, as a second row number "3" (reference position in claims), a light emitting element row number corresponding to the point 362 that corresponds to a toner adherence amount which is equal to the selected toner adherence amount 370. The toner adherence amount corresponding to the point 371 is equal to the toner adherence amount corresponding to the point 362. Since the points 371 and 362 correspond to the different light emitting element row numbers, the respective light emitting element row numbers, which correspond to the points 371 and 362, differ from each other by a difference Δd.

Further, the calculation unit 113 calculates a value of the difference Δd between the first row number and the second row number (Δd=the first row number−the second row number). Next, the calculation unit 113 increments the previous light emitting element row number stored in the data storage unit 111 (namely, the stored light emitting element row number 216), by the difference Δd, thus obtaining a new light emitting element row number.

(6) Judgment Unit 114

The judgment unit 114 judges whether the first row number and the second row number coincide with each other by judging whether the difference therebetween is less than a threshold value. Here, the threshold value is a sufficiently small value relative to the distance between each two light emitting elements that are adjacent in the lateral direction. The threshold value is for example 1/100, 1/200, 1/300, 1/500, or the like of the distance between each two light emitting elements which are adjacent in the lateral direction. In the case where the calculated difference is less than the threshold value, the judgment unit 114 judges that the first row number and the second row number coincide with each other. Meanwhile, in the case where the calculated difference is equal to or greater than the threshold value, the judgment unit 114 judges that the first row number and the second row number do not coincide with each other.

In the case where the calculated difference is equal to or greater than the threshold value, that is, when judging that the first row number and the second row number do not coincide with each other, the judgment unit 114 detects the calculated difference as a positional shift in the lateral direction between the light emitting element array 107 and the rod lens array 105 relative to the previous positional relation therebetween.

(7) Writing Unit 112

In the case where the judgment unit 114 judges that the first row number and the second row number do not coincide with each other, the writing unit 112 writes, as the current light emitting element row number 216, the new light emitting element row number obtained by the calculation unit 113 into the data storage unit 111.

2.3 Operations of Image Forming Device Relating to Modification (1)

Figure 19:
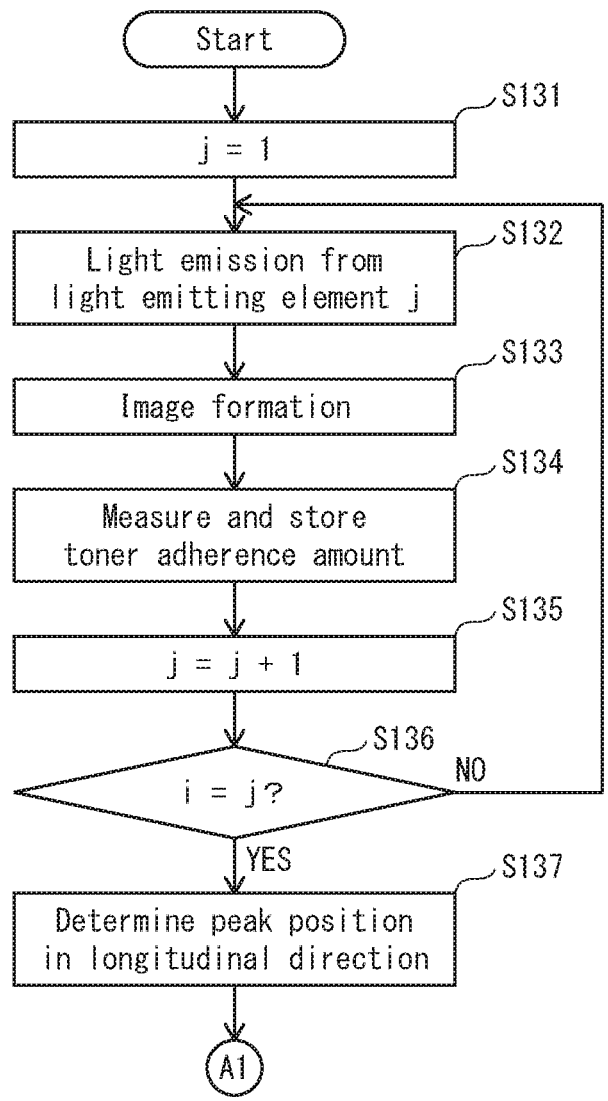
FIG. 19 is a flow chart showing operations performed by an image forming device relating to a modification (1), continuing to FIG. 20.
Figure 20:
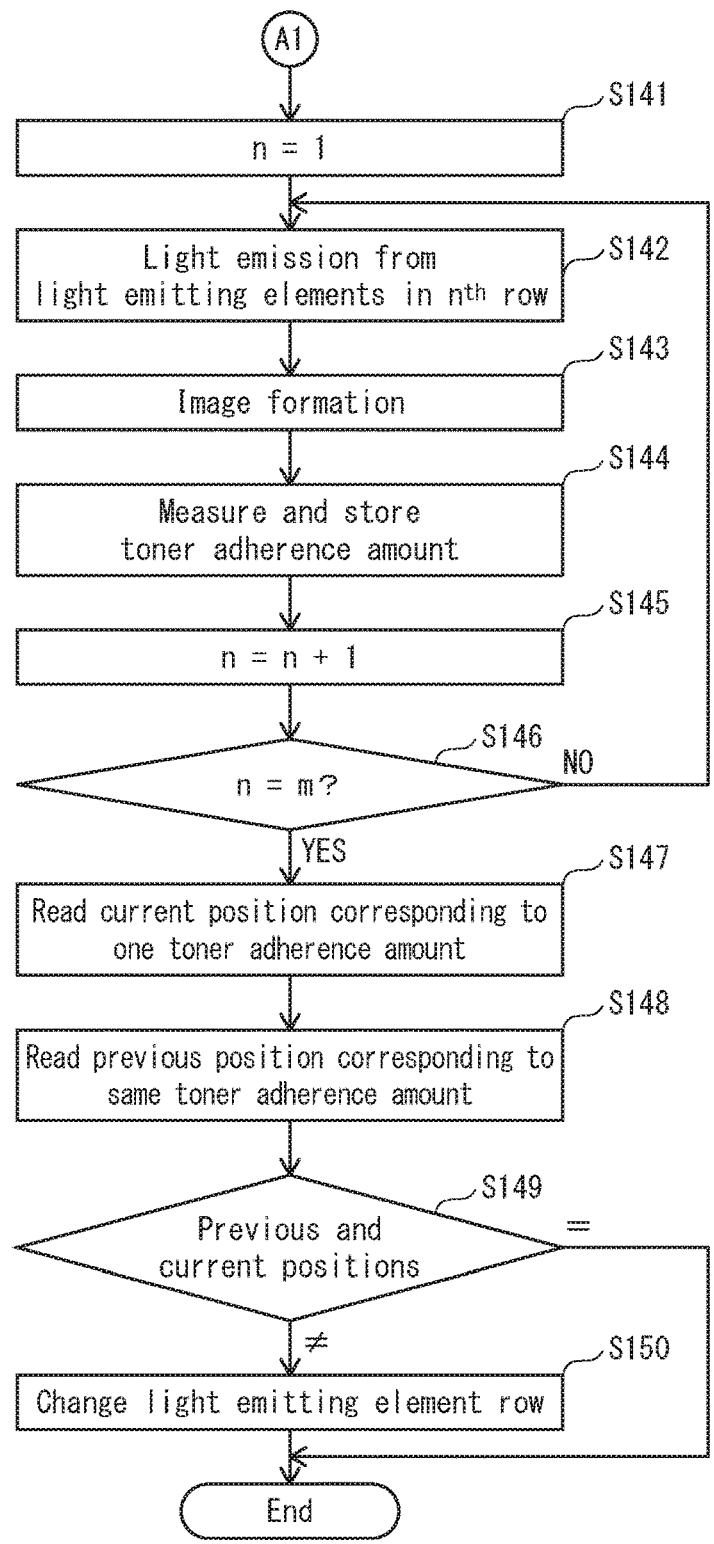
FIG. 20 is a flow chart showing the operations performed by the image forming device relating to the modification (1), continuing from FIG. 19.

The following describes the operations performed by the image forming device in the test mode, with reference to flow charts in FIGS. 19 and 20.

The light emitting element selection unit 116 sets, as an initial value, a variable j, which indicates a light emitting element number identifying a light emitting element included in a specific light emitting element row, to "1" for example (Step S131).

Next, the light emitting element selection unit 116 selects the light emitting element identified by the light emitting element number indicated by the variable j, and causes the selected light emitting element to emit light (Step S132). A toner image is formed on the outer circumferential surface of the photosensitive drum 103, and then the formed toner image is primarily transferred onto the intermediate transfer belt 31 (Step S133).

The sensor 35 acquires a toner adherence amount of the toner image formed on the intermediate transfer belt 31, and outputs the acquired toner adherence amount to the control unit 102. The writing unit 113 receives the toner adherence amount from the sensor 35, and writes the light emitting element number and the received toner adherence amount in pairs into the longitudinal-directional toner adherence amount table 311 (Step S134).

The light emitting element selection unit 116 increments the variable j by "1" (Step S135), and judges whether the variable j is equal to a predetermined value i (Step S136). Here, the predetermined value i indicates the number of light emitting elements for light emission.

In the case where the variable j is not equal to the predetermined value i (Step S136: NO), the control unit 102 returns to Step S132 to repeat the processing.

In the case where the variable j is equal to the predetermined value i (Step S136: YES), the calculation unit 113 selects the highest one among the toner adherence amounts stored in the longitudinal-directional toner adherence amount table 311. Then, the calculation unit 113 determines, as the peak position in the longitudinal direction, a light emitting element number corresponding to the selected highest toner adherence amount (Step S137).

Next, the light emitting element selection unit 116 sets, as an initial value, a variable n, which indicates a light emitting element row number identifying a light emitting element row, to "1" for example (Step S141).

Next, the light emitting element selection unit 116 selects for example 10th and 20th light emitting elements from the light emitting element row identified by the light emitting element row number indicated by the variable n, and causes the selected light emitting elements to emit light (Step S142). Here, the 10th and 20th light emitting elements correspond to the respective light emitting elements identified by the light emitting element numbers determined as the peak position in the longitudinal direction in Step S137. Then, a toner image is formed on the outer circumferential surface of the photosensitive drum 103, and then the formed toner image is primarily transferred onto the intermediate transfer belt 31 (Step S143).

The sensor 35 acquires a toner adherence amount of the toner image formed on the intermediate transfer belt 31, and outputs the acquired toner adherence amount to the control unit 102. The writing unit 112 receives the toner adherence amount from the sensor 35, and writes the light emitting element row number and the received toner adherence amount in pairs into the current toner adherence amount table 342 (Step S144).

The light emitting element selection unit 116 increments the variable n by "1" (Step S145), and judges whether the variable n is equal to a predetermined value m (Step S146). Here, the predetermined value m indicates the maximum number of the light emitting element rows.

In the case where the variable n is not equal to the predetermined value m (Step S146: NO), the control unit 102 returns to Step S142 to repeat the processing.

In the case where the variable n is equal to the predetermined value m (Step S146: YES), the calculation unit 113 selects one among the toner adherence amounts stored in the current toner adherence amount table 342, and extracts, as a first row number (current position), a light emitting element row number corresponding to the selected toner adherence amount (Step S147). Next, the calculation unit 113 extracts a toner adherence amount that is equal to the selected toner adherence amount with reference to the previous toner adherence amount table 341, and extracts, as a second row number (previous position), a light emitting element row number corresponding to the extracted toner adherence amount (Step S148).

The judgment unit 114 judges whether the first row (current position), which is extracted by the calculation unit 113, coincides with the second row number (previous position) (Step S149).

In the case where the first row number does not coincide with the second row number (Step S149: ≠) the calculation unit 113 calculates a difference Δd between the first row number and the second row number (Δd=first row number−second row number), and increments the stored previous light emitting element row number by the difference Δd, thus obtaining a new light emitting element row number. The control unit 102 changes the light emitting element row for light emission from the light emitting element row identified by the previous light emitting element row number to a light emitting element row identified by the obtained new light emitting element row number (Step S150). In the case where the first row number coincides with the second row number (Step S149: =), the control unit 102 does not change the light emitting element row for light emission.

This completes the operations performed by the image forming device relating to the modification (1) in the test mode.

2.4 Outline

In the modification (1), for each of the light emitting element rows of the light emitting element array 107, one or more light emitting elements are caused to emit a constant light amount, and a distribution of exposure amounts on the outer circumferential surface of the photosensitive drum 103 is calculated. The light emitting elements, which are caused to emit light, are each arranged on a center line of one of the rod lenses of the rod lens array 105. The center line extends in the lateral direction and is orthogonal to an optical axis of the rod lens. A position in the distribution corresponding to a predetermined exposure amount is calculated. The calculated position in the distribution corresponds to a position in the lateral direction in the rod lens array 105.

The calculated position is compared with the reference position. Here, the reference position is a position in a distribution at the reference time calculated in the same method as the above, and corresponds to a predetermined exposure amount. It is possible to sense a positional shift of the light emitting element array 107 relative to the rod lens array 105 in the sub scanning direction, with use of this comparison result.

3 Modification (2)

The following describes a control unit and an optical writing unit relating to a modification (2) of the above embodiment.

The control unit and the optical writing unit relating to the modification (2) respectively have the similar configurations to those of the control unit and the optical writing unit relating to the modification (1). The following description focuses differences from the modification (1).

In the modification (2), in the same manner as in the modification (1), the image forming device detects a positional shift in the main scanning direction between the rod lens array 105 and the light emitting element array 107, then detects a positional shift in the sub scanning direction therebetween, and changes the light emitting element row for light emission in the light emitting element array 107 based on the detected positional shifts. Here, the modification (2) differs from the modification (1) in terms of a method of detecting a positional shift in the sub scanning direction between the rod lens array 105 and the light emitting element array 107.

3.1 Detection and Correction of Positional Shift in Sub Scanning direction (1) Light Emitting Element Selection Unit 116

In the test mode, in order to sense a positional shift in the sub scanning direction between the rod lens array 105 and the light emitting element array 107, the light emitting element selection unit 116 instructs, under control by the control unit 102, the switches to select four light emitting element groups among the light emitting elements of the light emitting array 107. Here, the light emitting element groups are for example each constituted from six light emitting elements that are arranged in line in the sub scanning direction.

Here, selection of light emitting elements is performed such that toner images, which are formed on the intermediate transfer belt 31 through the process of exposure of the light emitting elements, image formation, and primary transfer, are positioned within a sensing range of the sensor 35.

Figure 21:
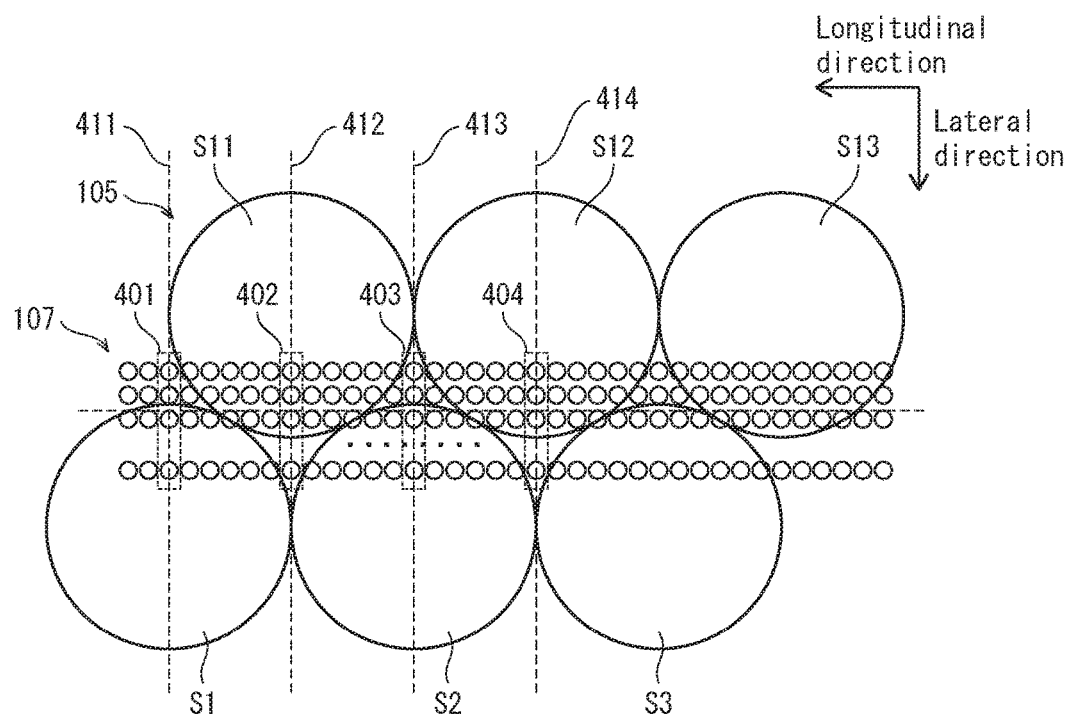
FIG. 21 schematically shows light emitting elements for light emission that are arranged in the lateral direction in the light emitting element array 107.

FIG. 21 shows for example four light emitting element groups 401, 402, 403, and 404 selected by the light emitting element selection unit 116.

Six light emitting elements included in the light emitting element group 401 are arranged in line on a center line 411 of the rod lens S1. The center line 411 extends in the lateral direction and is orthogonal to an optical axis of the rod lens S1. Similarly, six light emitting elements included in the light emitting element group 402 are arranged in line on a center line 412 of the rod lens S11, which extends in the lateral direction and is orthogonal to an optical axis of the rod lens S11. Six light emitting elements included in the light emitting element group 403 are arranged in line on a center line 413 of the rod lens S2, which extends in the lateral direction and is orthogonal to an optical axis of the rod lens S2. Six light emitting elements included in the light emitting element group 404 are arranged in line on a center line 414 of the rod lens S12, which extends in the lateral direction and is orthogonal to an optical axis of the rod lens S12.

The light emitting element groups 401 and 403 are respectively disposed on the center line 411 of the rod lens S1 and the center line 413 of the rod lens S2. The rod lenses S1 and S2 are included in one of the two rows constituted from the rod lenses arranged in a staggered arrangement in the rod lens array 105. Accordingly, the light emitting element groups 401 and 403 are classified into a first type. Meanwhile, the light emitting element groups 402 and 404 are respectively disposed on the center line 412 of the rod lens S11 and the center line 414 of the rod lens S12. The rod lenses S11 and S12 are included in the other row. Accordingly, the light emitting element groups 402 and 404 are classified into a second type. The types are each identified by a type number.

The sensor 35 acquires toner adherence amounts of toner images formed on the intermediate transfer belt 31 by exposure with use of a 1st light emitting element included in the light emitting element group 401 and a 1st light emitting element included in the light emitting element group 403, that is, the 1st light emitting elements included in the light emitting element groups of the first type.

Also, the sensor 35 acquires toner adherence amounts of toner images formed on the intermediate transfer belt 31 by exposure with use of a 2nd light emitting element included in the light emitting element group 401 and a 2nd light emitting element included in the light emitting element group 403, that is, the 2nd light emitting elements included in the light emitting element groups of the first type.

The same applies to exposure with use of a 3rd and subsequent light emitting elements included in the light emitting element group 401 and a 3rd and subsequent light emitting elements included in the light emitting element group 403, that is, the 3rd and subsequent light emitting elements included in the light emitting element groups of the first type.

Further, the sensor 35 acquires toner adherence amounts of toner images formed on the intermediate transfer belt 31 by exposure with use of a 1st light emitting element included in the light emitting element group 402 and a 1st light emitting element included in the light emitting element group 404, that is, the 1st light emitting elements included in the light emitting element groups of the second type.

Further, the sensor 35 acquires toner adherence amounts of toner images formed on the intermediate transfer belt 31 by exposure with use of a 2nd light emitting element included in the light emitting element group 402 and a 2nd light emitting element included in the light emitting element group 404, that is, the 2nd light emitting elements included in the light emitting element groups of the second type.

The same applies to exposure with use of a 3rd and subsequent light emitting elements included in the light emitting element group 402 and a 3rd and subsequent light emitting elements included in the light emitting element group 404, that is, the 3rd and subsequent light emitting elements included in the light emitting element groups of the second type.

(2) Example of Formed Toner Images

Figure 22A:
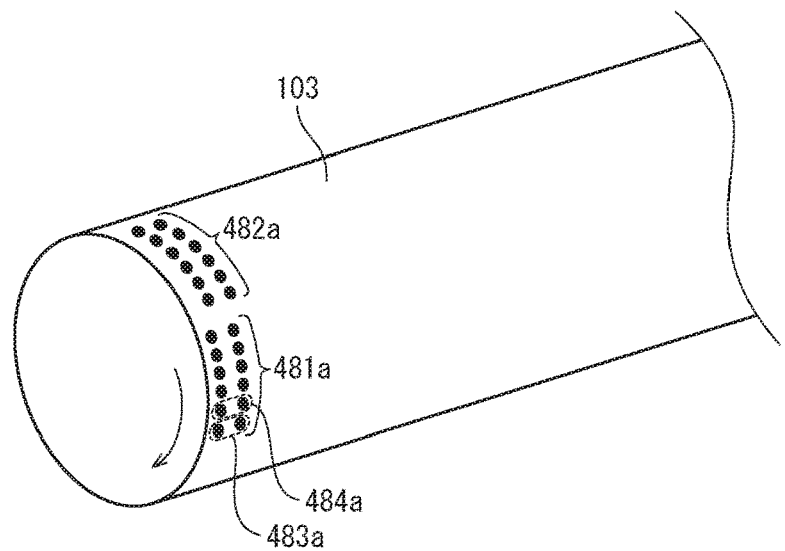
FIG. 22A shows an example of toner images that are formed on the outer circumferential surface of the photosensitive drum 103.
Figure 22B:
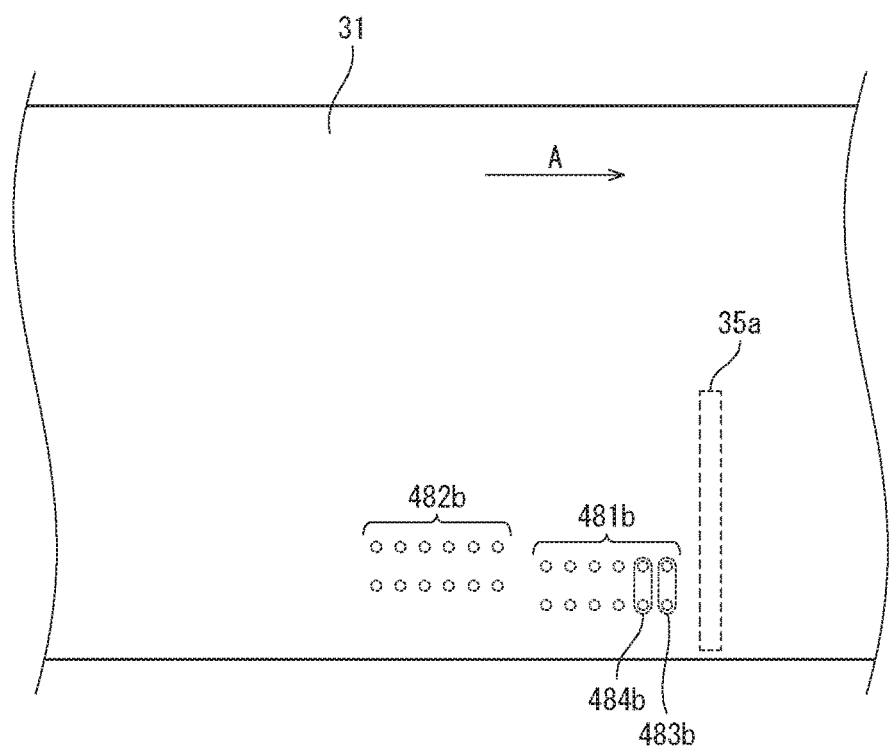
FIG. 22B shows an example of toner images that are formed on the intermediate transfer belt 31.

FIG. 22A shows an example of toner images that are formed on the outer circumferential surface of the photosensitive drum 103 in the test mode under control by the light emitting element selection unit 116 and the light emission timing adjustment unit 117. Also, FIG. 22B shows an example of toner images that are formed on the intermediate transfer belt 31.

As shown in FIG. 22A, toner image groups 481a and 482a are formed on the outer circumferential surface of the photosensitive drum 103. The toner image groups are each constituted from six toner images that are each composed of two toner adherence regions.

The toner image group 481a is formed by light emission from the light emitting element groups 401 and 403 shown in FIG. 21. Further particularly, a 1st toner image 483a, which is composed of two toner adherence regions, included in the toner image group 481a is formed by light emission from respective two light emitting elements that are arranged in a 1st order in the lateral direction in the light emitting element groups 401 and 403. A 2nd toner image 484a, which is composed of two toner adherence regions, included in the toner image group 481a is formed by light emission from respective two light emitting elements that are arranged in a 2nd order in the lateral direction in the light emitting element groups 401 and 403. The same applies to 3rd and subsequent images included in the toner image group 481a.

Also, the toner image group 482a is formed by light emission from the light emitting element groups 402 and 404 shown in FIG. 21. Further particularly, a 1st toner image, which is composed of two toner adherence regions, included in the toner image group 482a is formed by light emission from respective two light emitting elements that are arranged in a 1st order in the lateral direction in the light emitting element groups 402 and 404. A 2nd toner image, which is composed of two toner adherence regions, included in the toner image group 482a is formed by light emission from respective two light emitting elements that are arranged in a 2nd order in the lateral direction in the light emitting element groups 402 and 402. The same applies to 3rd and subsequent images included in the toner image group 482a.

Also, as shown in FIG. 22B, toner image groups 481b and 482b are formed on the intermediate transfer belt 31. Here, the surface of the intermediate transfer belt 31 shown in FIG. 22B is a back side opposite to the surface on which the toner image groups are formed. The toner image groups 481b and 482b are transferred from the photosensitive drum 103 and respectively correspond to the toner image groups 481a and 482a. The toner images 481b and 482b are formed on the intermediate transfer belt 31 in the stated order. Further particularly, toner images 483b, 484b, . . . that constitute the toner image group 481b are formed on the intermediate transfer belt 31 in the stated order. The same applies to toner images that constitute the toner image group 482b. Also, a range 35a indicates the sensing range of the sensor 35. When the intermediate transfer belt 31 rotates and thus the toner images 483b, 484b, . . . , which constitute the toner image group 481b, and the toner images, . . . which constitute the toner image group 482b, each fall within the range 35a, the sensor 35 senses a toner adherence amount of the toner image.

(3) Current Toner Adherence Amount Table 421 and Previous Toner Adherence Amount Table 431

The data storage unit 111 has a storage region for a current toner adherence amount table 421 as shown in FIG. 23 as an example. The data storage unit 111 further has a storage region for a previous (at a reference time in claims) toner adherence amount table 431 as shown in FIG. 24 as an example.

The current toner adherence amount table 421 and the previous toner adherence amount table 431 have the same data configuration.

The current toner adherence amount table 421 is a data table for storing toner adherence amounts acquired in the current measurement of toner adherence amount. The current toner adherence amount table 421 is composed of pairs of light emitting element row number and toner adherence amount for each of the type numbers identifying the types, as shown in FIG. 23. The pairs each correspond to a light emitting element row. The light emitting element row number indicates a number identifying a light emitting element row. The toner adherence amount indicates a toner adherence amount acquired in measurement with respect to the light emitting element row.

In the current toner adherence amount table 421 shown in FIG. 23, the pair of the light emitting element row number "1" and the toner adherence amount "75" of the type number "1" for example corresponds to the toner adherence amount of the toner image which is formed on the intermediate transfer belt 31 by exposure with use of the respective 1st light emitting elements included in the light emitting element groups 401 and 403 shown in FIG. 21.

The previous toner adherence amount table 431 is a data table for storing toner adherence amounts acquired in the previous measurement of toner adherence amount. The previous toner adherence amount table 431 is composed of pairs of light emitting element row number and toner adherence amount for each of the types as shown in FIG. 24. The pairs each correspond to a light emitting element row. The light emitting element row number indicates a number identifying a light emitting element row. The toner adherence amount indicates a toner adherence amount acquired in measurement with respect to the light emitting element row.

(4) Writing Unit 112

Upon receiving a toner adherence amount from the sensor 35, the writing unit 112 writes the received toner adherence amount and a light emitting element row number in pairs together with the type number into the current toner adherence amount table 421.

(5) Calculation Unit 113

Figure 25:
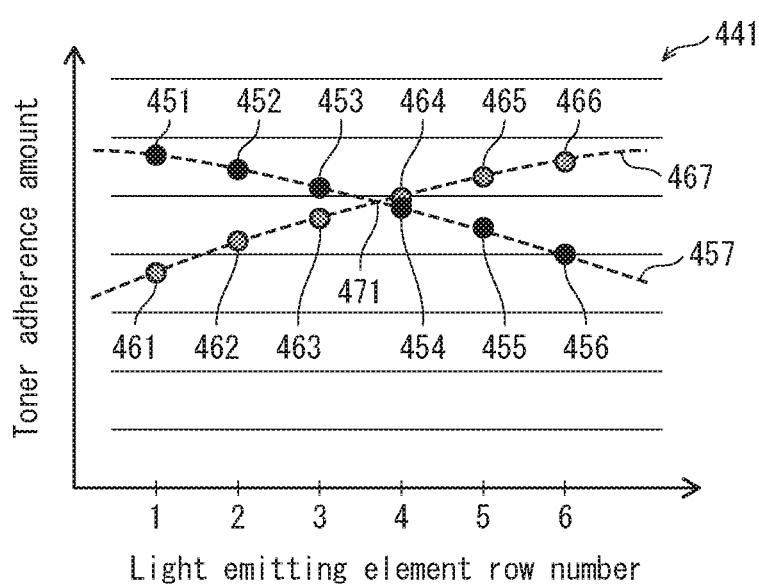
FIG. 25 is a graph showing a relation between light emitting element row number and toner adherence amount.

The calculation unit 113 obtains a graph 441 such as shown in FIG. 25 by virtually plotting the toner adherence amounts for the respective light emitting element rows identified by the light emitting element row numbers, with reference to the current toner adherence amount table 421. In the graph 441, the horizontal axis represents the light emitting element row number, and the vertical axis represents the toner adherence amount.

Points 451, 452, . . . , 456 correspond to the respective pairs of light emitting element row number and toner adherence amount of the type number "1" in the current toner adherence amount table 421. Points 461, 462, . . . , 466 correspond to the respective pairs of light emitting element row number and toner adherence amount of the type number "2" in the current toner adherence amount table 421.

The calculation unit 113 obtains a curved line 457 (first distribution in claims) by virtually connecting the points 451, 452, . . . , 456, and obtains a curved line 467 (second distribution in claims) by virtually connecting the points 461, 462, . . . , 466. The calculation unit 113 obtains an intersection position 471 between the curved lines 457 and 467, and calculates a light emitting element row number (position in claims) corresponding to the intersection position 471 as a current intersection position. In other words, the calculation unit 113 calculates the light emitting element row number corresponding to the same toner adherence amount that is included in both the first and second distributions.

In the same manner as the above, the calculation unit 113 calculates a light emitting element row number (reference position in claims) as a previous intersection position, with reference to the previous toner adherence amount table 431.

Here, the calculation unit 113 calculates, as the intersection position, the light emitting element row number having for example a real value such as "4.11", "4.12", and "4.13" as well as an integer value such as "1", "2", and "3".

(6) Judgment Unit 114

The judgment unit 114 calculates a difference between the current intersection position and the previous intersection position, and judges whether the current intersection position and the previous intersection position which are calculated by the calculation unit 113 coincide with each other by judging whether the calculated difference is less than a threshold value. Here, the threshold value is a sufficiently small value relative to the distance between each two light emitting elements that are adjacent in the lateral direction. The threshold value is for example $\frac{1}{100}$, $\frac{1}{200}$, $\frac{1}{300}$, $\frac{1}{500}$, or the like of the distance between each two light emitting elements which are adjacent in the lateral direction. In the case where the calculated difference is less than the threshold value, the judgment unit 114 judges that the current intersection position and the previous intersection position coincide with each other. Meanwhile, in the case where the calculated difference is equal to or greater than the threshold value, the judgment unit 114 judges that the current intersection position and the previous intersection position do not coincide with each other.

In the case where the calculated difference is equal to or greater than the threshold value, that is, when judging that the current intersection position and the previous intersection position coincide with each other, the judgment unit 114 detects the calculated difference as a positional shift in the lateral direction between the light emitting element array 107 and the rod lens array 105 relative to the previous positional relation therebetween.

(6) Writing Unit 112

In the case where the judgment unit 114 judges that the current intersection position and the previous intersection position do not coincide with each other, the writing unit 112 writes, as the current light emitting element row number 216, the light emitting element row number into the data storage unit 111.

3.2 Operations of Image Forming Device Relating to Modification (2)

Figure 26:
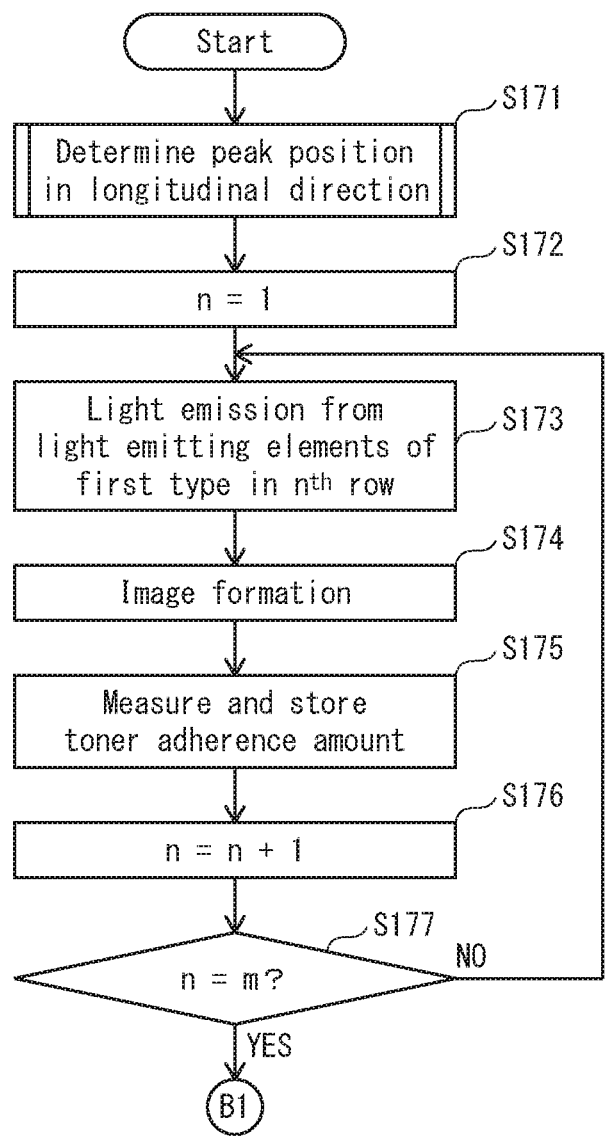
FIG. 26 is a flow chart showing operations performed by an image forming device relating to a modification (2), continuing to FIG. 27.
Figure 27:
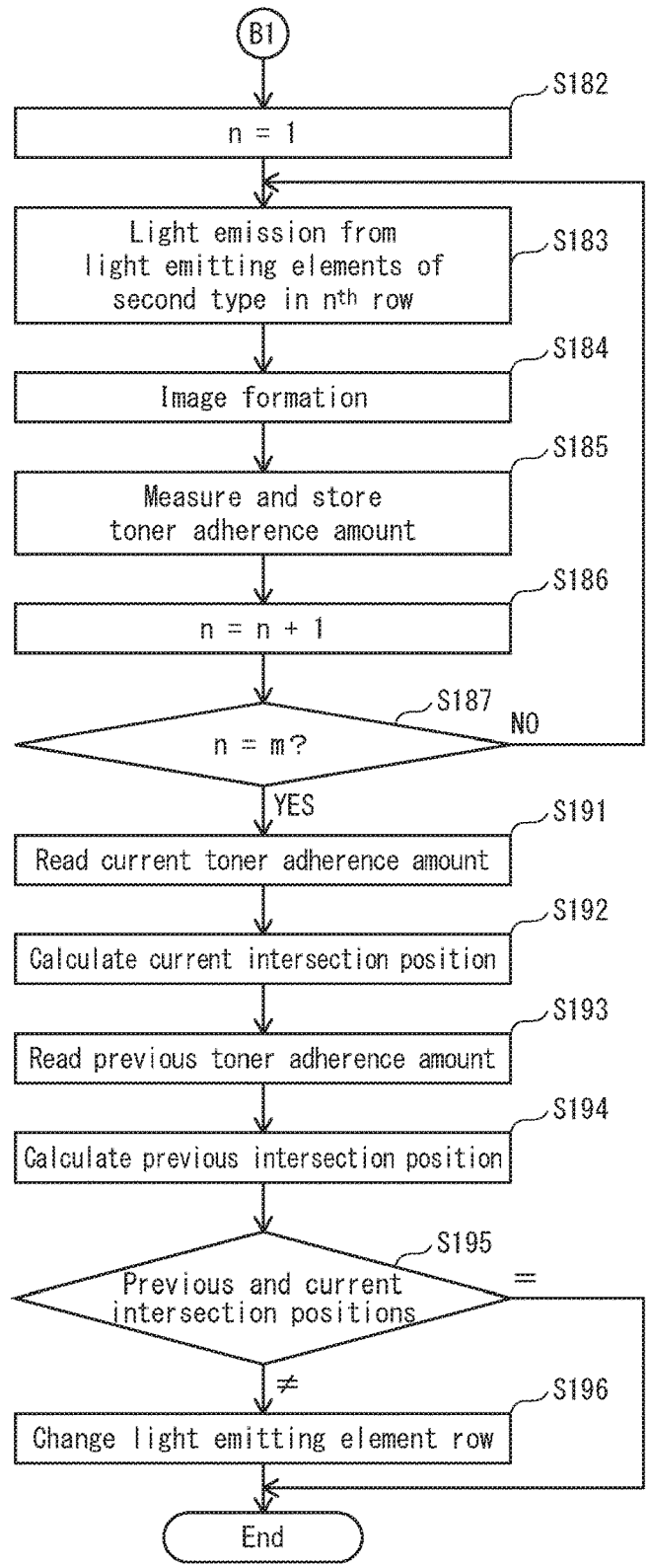
FIG. 27 is a flow chart showing the operations performed by the image forming device relating to the modification (2), continuing from FIG. 26.

The following describes the operations performed by the image forming device relating to the modification (2) in the test mode, with reference to flow charts in FIGS. 26 and 27.

A peak position in the longitudinal direction is determined (Step S171). The details for this step are the same as Steps S131 to S137 in FIG. 19.

Next, the light emitting element selection unit 116 sets, as an initial value, a variable n, which indicates a light emitting element number identifying a light emitting element included in the light emitting element groups of the first type, to "1" for example (Step S172).

Next, the light emitting element selection unit 116 selects two light emitting elements identified by the variable n from the light emitting element groups of the first type, and causes the selected light emitting elements to emit light (Step S173). Toner images are formed on the outer circumferential surface of the photosensitive drum 103, and then the formed toner images are primarily transferred onto the intermediate transfer belt 31 (Step S174).

The sensor 35 acquires a toner adherence amount of the toner image formed on the intermediate transfer belt 31, and outputs the acquired toner adherence amount to the control unit 102. The writing unit 112 receives the toner adherence amount from the sensor 35, and writes the received toner adherence amount and a light emitting element row number, which identifies a light emitting element row including the two selected light emitting elements, in pairs together with the type number into the current toner adherence amount table 421 (Step S175).

The light emitting element selection unit 116 increments the variable n by "1" (Step S176), and judges whether the variable n is equal to a predetermined value m (Step S177). Here, the predetermined value m for example indicates "6" that is the number of the light emitting element rows of the light emitting element array 107.

In the case where the variable n is not equal to the predetermined value m (Step S177: NO), the control unit 102 returns to Step S173 to repeat the processing.

In the case where the variable n is equal to the predetermined value m (Step S177: YES), the light emitting element selection unit 116 sets, as an initial value, the variable n, which indicates a light emitting element number identifying light emitting elements included in the light emitting element groups of the second type, to "1" for example (Step S182).

Next, the light emitting element selection unit 116 selects two light emitting elements identified by the variable n from the light emitting element groups of the second type, and causes the selected light emitting elements to emit light (Step S183). Toner images are formed on the outer circumferential surface of the photosensitive drum 103, and then the formed toner images are primarily transferred onto the intermediate transfer belt 31 (Step S184).

The sensor 35 acquires a toner adherence amount of the toner images formed on the intermediate transfer belt 31, and outputs the acquired toner adherence amount to the control unit 102. The writing unit 112 receives the toner adherence amount from the sensor 35, and writes the received toner adherence amount and a light emitting element row number, which identifies a light emitting element row including the two selected light emitting elements, in pairs together with the type number into the current toner adherence amount table 421 (Step S185).

The light emitting element selection unit 116 increments the variable n by "1" (Step S186), and judges whether the variable n is equal to the predetermined value m (Step S187).

In the case where the variable n is not equal to the predetermined value m (Step S187: NO), the control unit 102 returns to Step S183 to repeat the processing.

In the case where the variable n is equal to the predetermined value m (Step S187: YES), the calculation unit 113 reads the current toner adherence amount table 421 (Step S191), and calculates the current intersection position with reference to the read current toner adherence amount table 421 (Step S192).

Next, the calculation unit 113 reads the previous toner adherence amount table 431 (Step S193), and calculates the previous intersection position with reference to the read previous toner adherence amount table 431 (Step S194).

The judgment unit 114 judges whether the current intersection position and the previous intersection position, which are calculated by the calculation unit 113, coincide with each other (Step S195).

In the case where the judgment unit 114 judges that the current intersection position and the previous intersection position do not coincide with each other (Step S195: ≠), the control unit 102 changes the light emitting element row for light emission to a light emitting element row that is identified by a light emitting element row number corresponding to the current intersection position (Step S196).

In the case where the judgment unit 114 judges that the current intersection position and the previous intersection position coincide with each other (Step S195: =), the control unit 102 does not change the light emitting element row for light emission.

This completes the operations performed by the image forming device relating to the modification (2) in the test mode.

3.3 Outline

In the modification (2), with respect to each of the first row and the second row which are constituted from the rod lenses arranged in a staggered arrangement in the rod lens array 105, one or more light emitting elements are caused to emit a constant light amount for each of the light emitting element rows of the light emitting element array 107. The one or more light emitting elements are each arranged on a center line of one of the rod lenses, which extends in the lateral direction and is orthogonal to an optical axis of the rod lens. A first distribution and a second distribution of exposure amounts on the outer circumferential surface of the photosensitive drum 103 are calculated, which respectively correspond to distributions of exposure amounts acquired for the light emitting element rows with respect to the first and second rows. A position in the lateral direction where the first distribution and the second distribution intersect each other is calculated.

The calculated position is compared with the reference position, thus detecting a positional shift in the sub scanning direction between the rod lens array 105 and the light emitting element array 107.

4 Modification (3)

The following describes a control unit and an optical writing unit relating to a modification (3) of the above embodiment.

The control unit and the optical writing unit relating to the modification (3) respectively have the similar configurations to those of the control unit and the optical writing unit relating to the modification (1). The following description focuses differences from the modification (1).

In the modification (3), in the same manner as in the modification (1), the image forming device detects a positional shift in the sub scanning direction between the rod lens array 105 and the light emitting element array 107.

Figure 28:
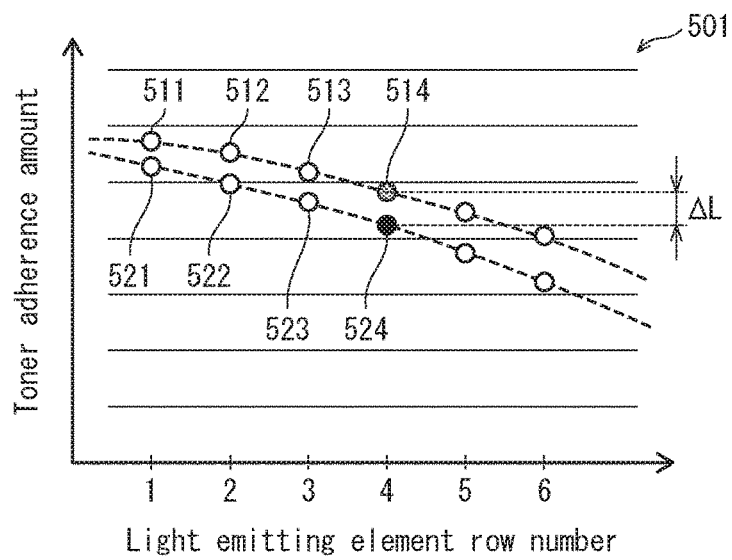
FIG. 28 is a graph showing a relation between light emitting element row number and toner adherence amount.

FIG. 28 shows a graph 501 plotting toner adherence amounts that are acquired for the respective light emitting element rows by the sensor 35. In the figure, the horizontal axis represents the light emitting element row number, and the vertical axis represents the toner adherence amount.

In the graph 501, points 511, 512, 513, 514, . . . for example correspond to the respective toner adherence amounts stored in the previous toner adherence amount table 341 (FIG. 16). Meanwhile, points 521, 522, 523, 524, . . . for example correspond to the respective toner adherence amounts stored in the current toner adherence amount table 342 (FIG. 17).

According to the graph 501, the current toner adherence amount corresponding to the light emitting element row number "4" from the previous toner adherence amount varies by a variation amount ΔL, for example.

The calculation unit 113 calculates the variation amount ΔL of toner adherence amount corresponding to a specific light emitting element row number, for example the light emitting element row number "4", with reference to the current toner adherence amount table 342 and the previous toner adherence amount table 341.

The control unit 102 varies a light amount of the light emitting elements for emission by an amount corresponding to the variation amount ΔL calculated by the calculation unit 113.

Figure 29:
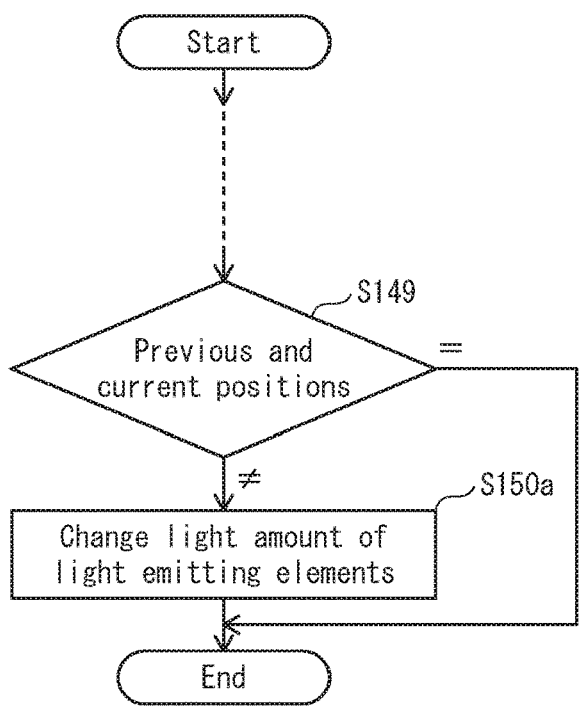
FIG. 29 is a flow chart showing operations performed by an image forming device relating to a modification (3).

The following describes the operations performed by the image forming device relating to the modification (3) in the test mode, with reference to a flow chart in FIG. 29.

The operations performed by the image forming device relating to the modification (3) in the test mode are the same as those relating to the modification (1) in the test mode shown in FIGS. 19 and 20. The following shows differences from the modification (1).

As shown in FIG. 29, in the case where the first row number does not coincide with the second row number (Step S149: ≠), the control unit 102 varies a light amount of the light emitting elements for emission by an amount corresponding to the variation amount ΔL calculated by the calculation unit 113 (Step S150*a*).

In the case where a positional shift in the sub scanning direction between the rod lens array 105 and the light emitting element array 107 is detected, it is possible to correct the positional shift by varying a light amount of light emitting elements for emission.

5 Other Modifications

Although the present invention has been described based on the above embodiment and modifications, the present invention is of course not limited to the above embodiment and modifications, and the following modifications of the present invention may be implemented.

(1) In the above embodiment and modifications, the light emitting element array, which is formed on the substrate, is constituted from six light emitting element rows. However, the present invention is not limited to this.

Alternatively, the light emitting element array, which is formed on the substrate, may be constituted from an arbitrary of two to five and seven or more light emitting element rows.

(2) In the above embodiment and modifications, the light emitting elements are OLEDs. Alternatively, the light emitting elements may be LEDs.

(3) In the above embodiment and modifications, the sensor 35 acquires an adherence amount of a toner image as an exposure amount by light emission from each of the light emitting elements.

The adherence amount of the toner image, which is acquired by the sensor 35, may indicate an average adherence amount in a toner adherence region which constitutes the toner image.

Further alternatively, the sensor 35 may acquire an adherence amount of a toner image formed on the outer circumferential surface of the photosensitive drum 103.

Yet alternatively, the sensor 35 may estimate an exposure amount by light emission from each of the light emitting elements by sensing an electrostatic latent image formed on the outer circumferential surface of the photosensitive drum 103.

In order to achieve the above aim, at least one aspect of the present invention provides an image forming device comprising: a photoreceptor; a longitudinal light emitting member that is constituted from light emitting element rows that are arranged in a lateral direction, the light emitting element rows each being constituted from light emitting elements that are arranged in a longitudinal direction; an optical member that is longitudinal in the longitudinal direction, is disposed so as to condense light emitted from the light emitting elements onto the photoreceptor, and has light condensing efficiency that is different depending on a position therein in the lateral direction; and a hardware processor that: selects, for each of the light emitting element rows, one or more light emitting elements among the light emitting elements constituting the light emitting element row, and causes the selected light emitting elements to emit light; acquires an exposure amount for each of the light emitting element rows; calculates a distribution of the exposure amounts that are acquired for the light emitting element rows, and calculates a position in the lateral direction corresponding to a predetermined exposure amount in the distribution; and judges whether a difference between the calculated position and a reference position in the lateral direction at a reference time is less than a threshold value.

With the above configuration, it is possible to exhibit to an excellent effect of detecting a positional shift in the lateral direction between the light emitting member and the optical member.

Here, when judging that the difference between the calculated position and the reference position is equal to or greater than the threshold value, the hardware processor may detect the difference as a positional shift in the lateral direction between the light emitting member and the optical member relative to a positional relation therebetween at the reference time.

Also, the optical member may be constituted from optical element rows that are arranged in the lateral direction, the optical element rows each being constituted from optical elements that are arranged in the longitudinal direction, the hardware processor may select the plurality of light emitting elements emitting light passing through at least one of the optical elements, the predetermined exposure amount may indicate a peak exposure amount in the distribution, and the reference position may correspond to a peak exposure amount in a distribution of exposure amounts that are acquired by light emission of the plurality of light emitting elements selected for the light emitting element rows at a past time indicated by the reference time, the selected light emitting elements emitting light passing through the at least one optical element.

Also, the optical member may be constituted from optical element rows that are arranged in the lateral direction, the optical element rows each being constituted from optical elements that are arranged in the longitudinal direction, the hardware processor may select the one or more light emitting elements that are each arranged on a center line of one of the optical elements, the center line extending in the lateral direction and being orthogonal to an optical axis of the one optical element, and the reference position may correspond to a predetermined exposure amount in a distribution of exposure amounts that are acquired by light emission of the one or more light emitting elements selected for the light emitting element rows at a past time indicated by the reference time, the selected one or more light emitting elements each being arranged on the center line of the one optical element, the center line extending in the lateral direction and being orthogonal to the optical axis of the one optical element.

Also, the optical member may be constituted from a first optical element row and a second optical element row that are arranged in the lateral direction, the first and second optical element rows each being constituted from optical elements that are arranged in the longitudinal direction, the optical elements being arranged in a staggered arrangement, the hardware processor may select, with respect to each of the first and second optical element rows, the one or more light emitting elements that are each arranged on a center line of one of the optical elements, the center line extending in the lateral direction and being orthogonal to an optical axis of the one optical element, the hardware processor may calculate, as the distribution, a first distribution and a second distribution, and calculate, as the position corresponding to the predetermined exposure amount, a position where the first distribution and the second distribution intersect each other, the first and second distributions being distributions of exposure amounts that are respectively acquired by light emission of the one or more light emitting elements selected for the light emitting element rows with respect to the first and second optical element rows, and the reference position may be a position where a third distribution and a fourth distribution intersect each other, the third and fourth distributions being distributions of exposure amounts that are respectively acquired by light emission of the one or more light emitting elements selected for the light emitting element rows with respect to the respective first and second optical element rows at a past time indicated by the reference time, the selected one or more light emitting elements each being arranged on the center line of the one optical element, the center line extending in the lateral direction and being orthogonal to the optical axis of the one optical element.

Also, the hardware processor may further: select, from one of the light emitting element rows, light emitting elements emitting light passing through at least one of the optical elements, and cause the selected light emitting elements to emit light; acquire an exposure amount for each of the selected light emitting elements; and calculate a distribution of the exposure amounts that are acquired for the selected light emitting elements, and specify, with use of the calculated distribution, one light emitting element among the selected light emitting elements that is arranged on the center line of the at least one optical element.

Also, in an image forming operation, the hardware processor may select and cause one of the light emitting element rows to emit light, the one light emitting element row corresponding to a position in the lateral direction that is the closest to the calculated position.

Also, in an image forming operation, the hardware processor may determine, with use of the detected positional shift, a light emission amount of each of light emitting elements included in one light emitting element row for light emission among the light emitting element rows.

Also, the image forming device may further comprise an image forming unit that forms an electrostatic latent image on the photoreceptor by light emission of the selected one or more light emitting elements, and develops the electrostatic latent image to form a toner image, wherein the acquisition unit may acquire amounts of toner adhered in the toner image as the exposure amounts.

Also, the adherence amount of the toner image acquired by the acquisition unit may indicate an average adherence amount in a region to which toner particles adhere.

At least one aspect of the present invention provides a control method for use in an image forming device, the image forming device including: a photoreceptor; a longitudinal light emitting member that is constituted from light emitting element rows that are arranged in a lateral direction, the light emitting element rows each being constituted from light emitting elements that are arranged in a longitudinal direction; and an optical member that is longitudinal in the longitudinal direction, is disposed so as to condense light emitted from the light emitting elements onto the photoreceptor, and has light condensing efficiency that is different depending on a position therein in the lateral direction, the control method comprising: selecting, for each of the light emitting element rows, one or more light emitting elements among the light emitting elements constituting the light emitting element row, and causing the selected light emitting elements to emit light; acquiring an exposure amount for each of the light emitting element rows; calculating a distribution of the exposure amounts that are acquired for the light emitting element rows, and calculating a position in the lateral direction corresponding to a predetermined exposure amount in the distribution; and judging whether a difference between the calculated position and a reference position in the lateral direction at a reference time is less than a threshold value.

At least one aspect of the present invention provides a non-transitory computer-readable recording medium recording thereon a control computer program for use in an image forming device, the image forming device including: a photoreceptor; a longitudinal light emitting member that is constituted from light emitting element rows that are arranged in a lateral direction, the light emitting element rows each being constituted from light emitting elements that are arranged in a longitudinal direction; and an optical member that is longitudinal in the longitudinal direction, is disposed so as to condense light emitted from the light emitting elements onto the photoreceptor, and has light condensing efficiency that is different depending on a position therein in the lateral direction, the computer program causing the image forming device that is a computer to execute: selecting, for each of the light emitting element rows, one or more light emitting elements among the light emitting elements constituting the light emitting element row, and causing the selected light emitting elements to emit light; acquiring an exposure amount for each of the light emitting element rows; calculating a distribution of the exposure amounts that are acquired for the light emitting element rows, and calculating a position in the lateral direction corresponding to a predetermined exposure amount in the distribution; and judging whether a difference between the calculated position and a reference position in the lateral direction at a reference time is less than a threshold value.

The present invention may be any combination of the above embodiment and modifications.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming device comprising:
a photoreceptor;
a longitudinal light emitting member that is constituted from light emitting element rows that are arranged in a lateral direction, the light emitting element rows each being constituted from light emitting elements that are arranged in a longitudinal direction;
an optical member that is longitudinal in the longitudinal direction, is disposed so as to condense light emitted from the light emitting elements onto the photoreceptor, and has light condensing efficiency that is different depending on a position therein in the lateral direction; and
a hardware processor that:
selects, for each of the light emitting element rows, one or more light emitting elements among the light emitting elements constituting the light emitting element row, and causes the selected light emitting elements to emit light;
acquires an exposure amount for each of the light emitting element rows;
calculates a distribution of the exposure amounts that are acquired for the light emitting element rows, and calculates a position in the lateral direction corresponding to a predetermined exposure amount in the distribution; and judges whether a difference between the calculated position and a reference position in the lateral direction at a reference time is less than a threshold value.

2. The image forming device of claim 1, wherein
when judging that the difference between the calculated position and the reference position is equal to or greater than the threshold value, the hardware processor detects the difference as a positional shift in the lateral direction between the light emitting member and the optical member relative to a positional relation therebetween at the reference time.

3. The image forming device of claim 2, wherein
in an image forming operation, the hardware processor determines, with use of the detected positional shift, a light emission amount of each of light emitting elements included in one light emitting element row for light emission among the light emitting element rows.

4. The image forming device of claim 1, wherein
the optical member is constituted from optical element rows that are arranged in the lateral direction, the optical element rows each being constituted from optical elements that are arranged in the longitudinal direction,
the hardware processor selects the plurality of light emitting elements emitting light passing through at least one of the optical elements,
the predetermined exposure amount indicates a peak exposure amount in the distribution, and
the reference position corresponds to a peak exposure amount in a distribution of exposure amounts that are acquired by light emission of the plurality of light emitting elements selected for the light emitting element rows at a past time indicated by the reference time, the selected light emitting elements emitting light passing through the at least one optical element.

5. The image forming device of claim 1, wherein
the optical member is constituted from optical element rows that are arranged in the lateral direction, the optical element rows each being constituted from optical elements that are arranged in the longitudinal direction,
the hardware processor selects the one or more light emitting elements that are each arranged on a center line of one of the optical elements, the center line extending in the lateral direction and being orthogonal to an optical axis of the one optical element, and
the reference position corresponds to a predetermined exposure amount in a distribution of exposure amounts that are acquired by light emission of the one or more light emitting elements selected for the light emitting element rows at a past time indicated by the reference time, the selected one or more light emitting elements each being arranged on the center line of the one optical element, the center line extending in the lateral direction and being orthogonal to the optical axis of the one optical element.

6. The image forming device of claim 5, wherein
the hardware processor further:
selects, from one of the light emitting element rows, light emitting elements emitting light passing through at least one of the optical elements, and causes the selected light emitting elements to emit light;
acquires an exposure amount for each of the selected light emitting elements; and
calculates a distribution of the exposure amounts that are acquired for the selected light emitting elements, and specifies, with use of the calculated distribution, one light emitting element among the selected light emitting elements that is arranged on the center line of the at least one optical element.

7. The image forming device of claim 1, wherein
the optical member is constituted from a first optical element row and a second optical element row that are arranged in the lateral direction, the first and second optical element rows each being constituted from optical elements that are arranged in the longitudinal direction, the optical elements being arranged in a staggered arrangement,
the hardware processor selects, with respect to each of the first and second optical element rows, the one or more light emitting elements that are each arranged on a center line of one of the optical elements, the center line extending in the lateral direction and being orthogonal to an optical axis of the one optical element,
the hardware processor calculates, as the distribution, a first distribution and a second distribution, and calculates, as the position corresponding to the predetermined exposure amount, a position where the first distribution and the second distribution intersect each other, the first and second distributions being distributions of exposure amounts that are respectively acquired by light emission of the one or more light emitting elements selected for the light emitting element rows with respect to the first and second optical element rows, and
the reference position is a position where a third distribution and a fourth distribution intersect each other, the third and fourth distributions being distributions of exposure amounts that are respectively acquired by light emission of the one or more light emitting elements selected for the light emitting element rows with respect to the respective first and second optical element rows at a past time indicated by the reference time, the selected one or more light emitting elements each being arranged on the center line of the one optical element, the center line extending in the lateral direction and being orthogonal to the optical axis of the one optical element.

8. The image forming device of claim 1, wherein
in an image forming operation, the hardware processor selects and causes one of the light emitting element rows to emit light, the one light emitting element row corresponding to a position in the lateral direction that is the closest to the calculated position.

9. The image forming device of claim 1, further comprising
an image forming unit that forms an electrostatic latent image on the photoreceptor by light emission of the selected one or more light emitting elements, and develops the electrostatic latent image to form a toner image, wherein
the acquisition unit acquires amounts of toner adhered in the toner image as the exposure amounts.

10. The image forming device of claim 9, wherein
the adherence amount of the toner image acquired by the acquisition unit indicates an average adherence amount in a region to which toner particles adhere.

11. A control method for use in an image forming device, the image forming device including: a photoreceptor; a longitudinal light emitting member that is constituted from light emitting element rows that are arranged in a lateral direction, the light emitting element rows each being constituted from light emitting elements that are arranged in a longitudinal direction; and an optical member that is longitudinal in the longitudinal direction, is disposed so as to condense light emitted from the light emitting elements onto the photoreceptor, and has light condensing efficiency that is different depending on a position therein in the lateral direction, the control method comprising:

selecting, for each of the light emitting element rows, one or more light emitting elements among the light emitting elements constituting the light emitting element row, and causing the selected light emitting elements to emit light;

acquiring an exposure amount for each of the light emitting element rows;

calculating a distribution of the exposure amounts that are acquired for the light emitting element rows, and calculating a position in the lateral direction corresponding to a predetermined exposure amount in the distribution; and judging whether a difference between the calculated position and a reference position in the lateral direction at a reference time is less than a threshold value.

12. A non-transitory computer-readable recording medium recording thereon a control computer program for use in an image forming device, the image forming device including: a photoreceptor; a longitudinal light emitting member that is constituted from light emitting element rows that are arranged in a lateral direction, the light emitting element rows each being constituted from light emitting elements that are arranged in a longitudinal direction; and an optical member that is longitudinal in the longitudinal direction, is disposed so as to condense light emitted from the light emitting elements onto the photoreceptor, and has light condensing efficiency that is different depending on a position therein in the lateral direction, the computer program causing the image forming device that is a computer to execute:

selecting, for each of the light emitting element rows, one or more light emitting elements among the light emitting elements constituting the light emitting element row, and causing the selected light emitting elements to emit light;

acquiring an exposure amount for each of the light emitting element rows;

calculating a distribution of the exposure amounts that are acquired for the light emitting element rows, and calculating a position in the lateral direction corresponding to a predetermined exposure amount in the distribution; and judging whether a difference between the calculated position and a reference position in the lateral direction at a reference time is less than a threshold value.

* * * * *